(12) United States Patent
Thome et al.

(10) Patent No.: US 12,608,368 B2
(45) Date of Patent: Apr. 21, 2026

(54) HIGH-LEVEL QUERY CONVERSION SYSTEM WITH PREFIX-BASED SEARCH FOR DATA STORES

(71) Applicant: GitLab Inc., San Francisco, CA (US)

(72) Inventors: Julian Thome, Esch-sur-Alzette (LU); Isaac Dawson, Yokohama (JP); Jason Leasure, Columbia, MD (US); Thomas Woodham, Greer, SC (US)

(73) Assignee: GitLab Inc., San Francisco, CA (US)

( * ) Notice: Subject to any disclaimer, the term of this patent is extended or adjusted under 35 U.S.C. 154(b) by 0 days.

(21) Appl. No.: 18/886,929

(22) Filed: Sep. 16, 2024

(65) Prior Publication Data

US 2026/0079921 A1 Mar. 19, 2026

(51) Int. Cl.
*G06F 16/242* (2019.01)
*G06F 16/2452* (2019.01)
*G06F 16/248* (2019.01)

(52) U.S. Cl.
CPC ...... *G06F 16/2425* (2019.01); *G06F 16/2452* (2019.01); *G06F 16/248* (2019.01)

(58) Field of Classification Search
CPC . G06F 16/2425; G06F 16/2452; G06F 16/248
USPC .......... 707/722, 736, 760, 769, 797
See application file for complete search history.

(56) References Cited

U.S. PATENT DOCUMENTS

| | | | |
|---|---|---|---|
| 6,678,672 B1 * | 1/2004 | Ramasamy ........... | G06F 16/283 707/999.002 |
| 9,734,180 B1 | 8/2017 | Graham et al. | |
| 2018/0181613 A1 * | 6/2018 | Acharya ............... | G06F 16/243 |
| 2023/0120592 A1 * | 4/2023 | Deshwal ........... | G06F 16/24528 707/760 |
| 2023/0124100 A1 * | 4/2023 | Rai ..................... | G06F 16/2455 707/769 |
| 2024/0126761 A1 * | 4/2024 | Tummala .............. | G06F 16/258 |

OTHER PUBLICATIONS

PCT International Search Report and Written Opinion, PCT Application No. PCT/US2025/046408, Dec. 19, 2025, 15 pages.

* cited by examiner

*Primary Examiner* — Phong H Nguyen

(74) *Attorney, Agent, or Firm* — Fenwick & West LLP

(57) ABSTRACT

A system includes a computing server having a processor and memory. The memory stores code including instructions. The instructions, when executed by the system, cause the system to perform steps including receiving a query from a user device, converting the query into a predicate expression data instance, generating an iteration tree based on the predicate expression data instance, determining search data based on the generated iteration tree, accessing a set of index entries of the key-value store, and searching the set of index entries based on the search data. A graphical user interface is in communication with the computing server and configured to display an indicator associated with the results of the search.

20 Claims, 15 Drawing Sheets

100

300

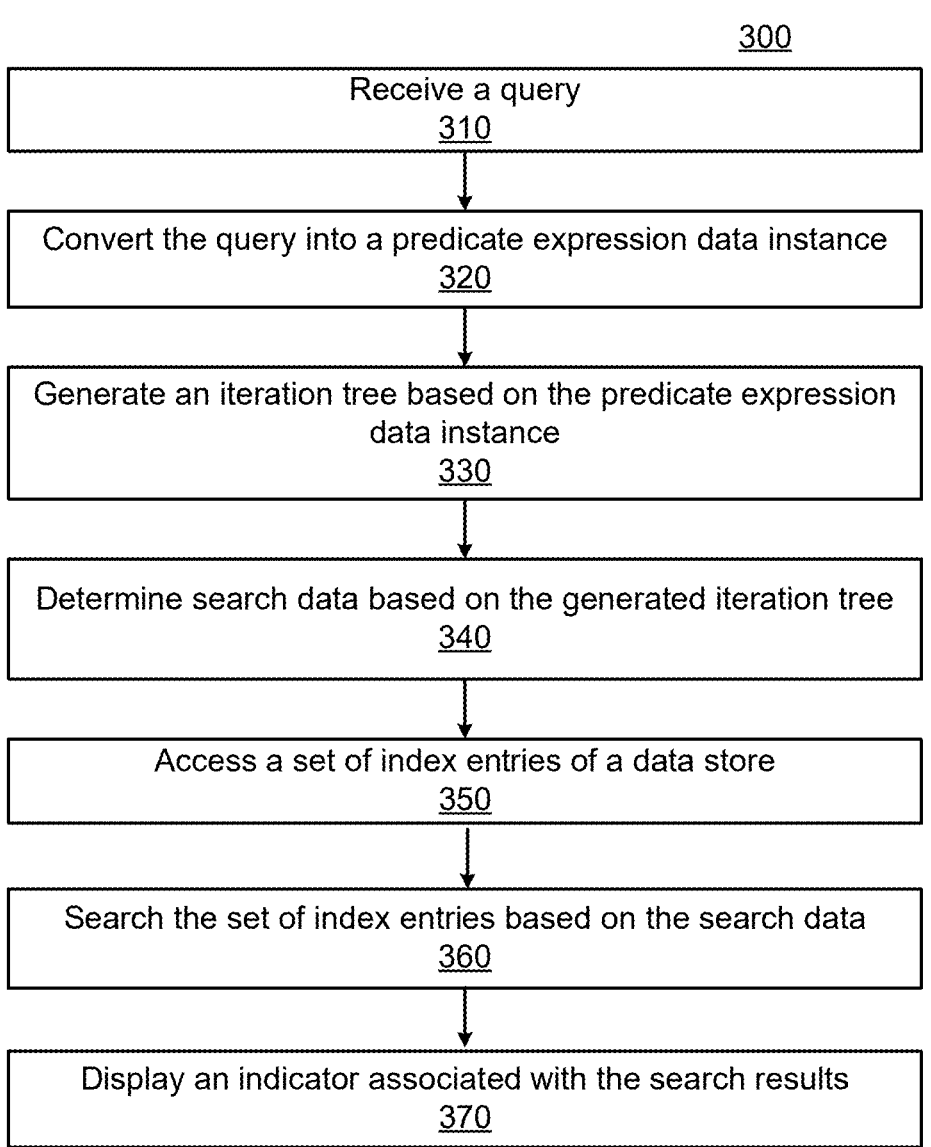

Receive a query
310

Convert the query into a predicate expression data instance
320

Generate an iteration tree based on the predicate expression data instance
330

Determine search data based on the generated iteration tree
340

Access a set of index entries of a data store
350

Search the set of index entries based on the search data
360

Display an indicator associated with the search results
370

FIG. 3

| k | v |
|---|---|
| 0 | (name: Alice, age: 15) |
| 1 | (name: Alice, age: 10) |
| 2 | (name: Bob, age: 55) |
| 3 | (name: Zed, age: 1) |
| 4 | (name: Dennis, age: 12) |
| 5 | (name: Morty, age: 44) |
| 6 | (name: Olivia, age: 60) |
| 7 | (name: Marta, age: 90) |
| nameAlice0 | 0 |
| nameAlice1 | 1 |
| nameBob2 | 2 |
| nameZed3 | 3 |
| nameDennis4 | 4 |
| nameMorty5 | 5 |
| nameOlivia6 | 6 |
| nameMarta7 | 7 |

FIG. 10

HIGH-LEVEL QUERY CONVERSION SYSTEM WITH PREFIX-BASED SEARCH FOR DATA STORES

BACKGROUND

Technical Field

The subject matter described relates to converting and executing queries in resource-constrained environments. More precisely, it relates to converting a high-level query into an optimized format suitable for efficient execution on a low-level database (e.g., a key value store), and executing the converted query using a specialized evaluation engine.

Background Information

There are many challenges associated with the execution of queries across multiple platforms. For example, querying data from disparate systems often requires users to navigate different languages, formats, and protocols, making seamless execution a demanding and time-consuming process.

These obstacles and others may contribute to a steep learning curve and inefficiencies in handling query execution and data management across different platforms.

Low-level databases such as key value stores can provide desirable performance and scalability due to their simplicity. In contrast to relational databases, the data in key value stores can generally be more easily partitioned, fragmented, or shared because it is typically less entangled. However, this comes at the cost of not having higher level query systems that enable complex queries to be performed.

SUMMARY

The above and other problems may be addressed by systems and methods for converting a high-level query into one or more low level formats suitable for use with a data store. In one embodiment, the system includes a computing server having a processor and memory. The memory is configured to store code including instructions. The instructions, when executed by the system, cause the system to perform steps including receiving a query from a user device, converting the query into a predicate expression data instance, generating an iteration tree based on the predicate expression data instance, determining search data based on the generated iteration tree, accessing a set of index entries of the key-value store, and searching the set of index entries based on the search data. A graphical user interface is in communication with the computing server and configured to display an indicator associated with the search results.

BRIEF DESCRIPTION OF THE DRAWINGS

FIG. 3 illustrates a flowchart depicting an example process for converting and executing a query, according to one embodiment.

FIG. 10 illustrates entries in a key value store, according to one embodiment.

DETAILED DESCRIPTION

The figures and the following description describe certain embodiments by way of illustration only. One skilled in the art will readily recognize from the following description that alternative embodiments of the structures and methods may be employed without departing from the principles described. Wherever practicable, similar or like reference numbers are used in the figures to indicate similar or like functionality. Where elements share a common numeral followed by a different letter, this indicates the elements are similar or identical. A reference to the numeral alone generally refers to any one or any combination of such elements unless the context indicates otherwise.

Example Systems

Figure 1:
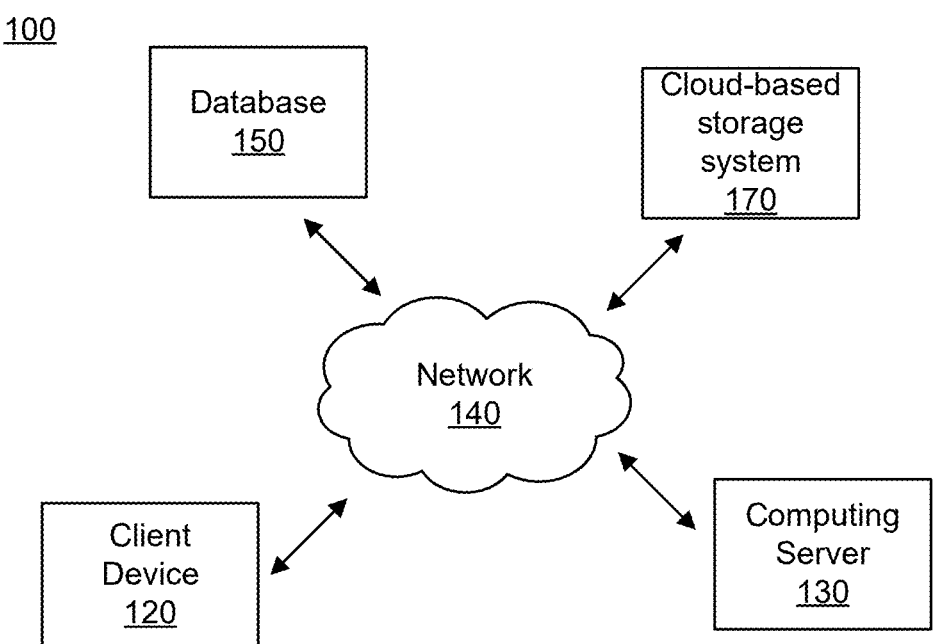
FIG. 1 is a block diagram of a networked computing environment in which a universal query language may be used, according to one embodiment.

FIG. 1 illustrates one embodiment of a networked computing environment 100 in which a universal query language may be used. In the embodiment shown, the networked computing environment 100 includes one or more client devices 120, a computing server 130, a database 150, and a cloud-based storage system 170, all connected via a network 140. In other embodiments, the networked computing environment 100 includes different or additional elements. In addition, the functions may be distributed among the elements in a different manner than described.

A client device 120 is a computing device (e.g., desktop, laptop, tablet, smartphone, etc.) that a user can use to interact with the computing server 130. For example, the user can use the client device 120 to send a query to the computing server 130. A query can be a request for information from a database or data storage system. The query can be used to retrieve, filter, manipulate, or modify data stored in a system based on certain conditions or defined criteria. The query can be formulated using a specific query language or syntax.

A user may interact with an application or a web interface (GUI) on the client device 120. The interface may include text input fields, drop-down menus, or graphical components. For example, as the user inputs data, the client application may perform local validation checks to ensure the user input is properly formatted and complies with the rules of the system. The validation can include checking for syntactic correctness and mandatory fields before allowing the query to be submitted. For example, once the user input passes validation, a corresponding database query is generated and submitted. In some embodiments, this triggers the client application to package the query as a request to be sent to the computing server. For example, the client application prepares the request, which includes the entered query along with any additional necessary information, such as user identification or authentication tokens. The request may be formatted as an HTTP or HTTPS request, an application programming interface (API) call, or any other suitable communication method. The prepared request is transmitted from the client device 120 to the computing server 130 through the network 140. In other embodiments, the client device 120 may process and convert the query into an appropriate format for execution on the target system. In these cases, after converting the query into the appropriate format, the client device 120 may either directly send the converted query to the target system or transmit it to the computing server for delegation to the target system.

The computing server 130 includes one or more computing devices that may facilitate collaboration between different components of the system 100 and may provide a centralized point of control. The computing server 130 may manage the communication, query processing, and interaction with target systems 150, and 170 to fulfill the user's request effectively and securely.

The computing server 130 can listen for incoming requests from the client device 120 over the communication channels provided by the network 140. Upon receiving a request, the computing server 130 can process the query contained within the request. For example, the computing server extracts essential information from the received request, including the query, user identification, authentication tokens, and any additional parameters or metadata. It may also validate the request further to verify it meets the system's security and formatting requirements before proceeding. If the system requires user authentication, the server checks the user identification and authentication tokens against its user database or authentication service to verify the user's identity and ensure they have appropriate permissions to perform the requested query. The computing server 130 can analyze the received query to determine the appropriate interfaces or target systems to use for query execution. This step may include parsing the query into different components, such as tokens, relational operators, values, or logical operators.

Based on the identified target systems and their corresponding interfaces, the computing server 130 can convert the query into suitable formats matching each target system's accepted query language or syntax. Converting the query into suitable formats for each target system offers significant advantages such as streamlined user experience, centralized query management, consistent data access, improved security, enhanced query optimization and simplified system maintenance. Further, by converting a query into suitable formats for each target system, the system becomes more scalable, as it can easily adapt to accommodate additional target systems or cater to larger data volumes. Centralizing query processing and execution simplifies scalability management, ultimately enhancing overall system performance and resilience. Overall, these features lead to a more efficient, secure, and user-friendly experience across multiple target systems.

The converted queries can then be executed on their respective target systems, which process the query and retrieve or modify requested data accordingly. The computing server 130 may handle any necessary communication with each target system to send a query and receive the results. When querying multiple systems, the computing server can aggregate the obtained results based on the system's rules and requirements, preparing a unified result set to be sent back to the user. The computing server 130 may package the aggregated results into a response format compatible with the client device 120, such as HTTP, HTTPS, or API response, and sends it back to the client device 120 through the network 140. The advantages of aggregation include unified data presentation, facilitated access control, improved performance, enhanced scalability, conflict resolution, streamlined troubleshooting, and reduced network overhead. Aggregating results from multiple target systems offers a centralized method for combining data, ensuring accuracy and consistency while providing a user-friendly output and improved system performance. In some embodiments, the computer server may split up into various parts and execute it multiple times against the same target system. For example, the query syntax may allow the user to join results in a way the target system does not support. Therefore, the computing server or (client device) may issue multiple queries and combine the results.

Different types of target systems can be queried. For example, each target system can have a unique interface and query language tailored to its specific implementations and data structures. Some examples of target systems are the database 150 and the cloud-based storage system 170. In some embodiments, the computing server 130 may also act as a target system with various interfaces like GraphQL, Advanced Search, REST, RSS, and so forth. For example, the computing server 130 may handle authentication and authorization centrally, and hence, may offer functionalities similar to those of a target system, by interpreting and delegating to the data stores.

The database 150 can be a Key Value (KV) store. The KV store is a low-level, schema-free database system that organizes data as a collection of key-value pairs. It may offer simplicity, high performance, and excellent scaling capabilities, making it suitable for applications requiring fast data access. KV stores may provide basic operations like put, get, and delete, along with efficient key prefix searches.

In some embodiments, as opposed to relational database systems or object stores, KV stores may operate on a lower level that is usually schema free. The key of a KV store may be a reference to the data of interest which is represented by a value. In contrast to relational databases, KV stores may have the advantage that data can be more easily partitioned, fragmented, or shared because it is usually less entangled. Database systems such as relational databases or object stores may often provide high-level query languages to operate with the data. They may have schemas, dedicated indices, primary and foreign keys to model relationships. KV stores may provide a more simplistic API to operate and work with the data by means of key prefix search and database iterators. For example, an iterator can access a dataset by means of a key (prefix) that returns the subset of the data (key-value pairs) that matches the defined key. These searches may be very fast when performed in isolation. More complex queries that may require the combination of multiple iterators may be expensive without optimizing the underlying query in order to reduce database reads.

Among many advantages, the present disclosure addresses the challenges of complex queries in KV stores through a multi-step optimization process. For example, the computing server 130 may convert a high-level query into a predicate expression data instance, which may then be optimized. The data instance may be used to generate a lazy data object iterator tree, representing an efficient query plan. The computing server 130 may provide a layered data access approach, prioritizing cached data and index entries over full data scans, thus minimizing database reads. To improve query performance, the computing server 130 may provide key prefix search capabilities and use a specialized data layout separating index and data entries. The computing server 130 may efficiently combine multiple iterators by prioritizing more selective predicate data instances and use lazy evaluation techniques. An iterator tree evaluation engine may execute the optimized query. Throughout the process, the computing server 130 may process queries effectively in resource-constrained environments, minimizing both computational and storage requirements.

The cloud-based storage systems 170 are platforms that store and retrieve data in the cloud, accessible through custom interface commands or APIs. Some or all of the cloud-based storage system 170 may store data in KV stores.

The network 140 provides the communication channels via which the other elements of the networked computing environment 100 communicate. The network 140 can include any combination of local area and wide area networks, using wired or wireless communication systems. In one embodiment, the network 140 uses standard communications technologies and protocols. For example, the network 140 can include communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 140 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 140 may be represented using any suitable format, such as hypertext markup language (HTML) or extensible markup language (XML). In some embodiments, some or all of the communication links of the network 140 may be encrypted using any suitable technique or techniques.

Figure 2:
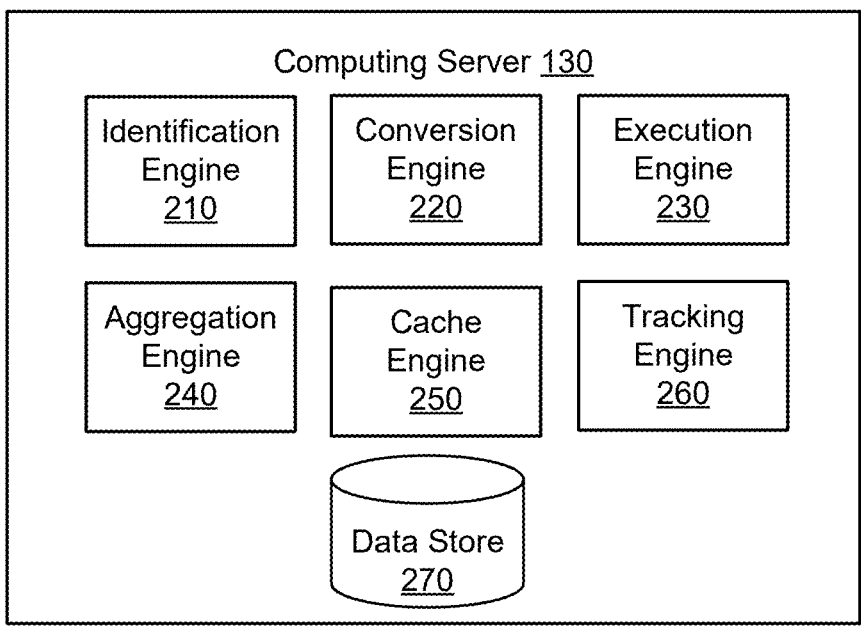
FIG. 2 illustrates a block diagram of the computing server of FIG. 1, according to one embodiment.

FIG. 2 illustrates one embodiment of the computing server 130 of FIG. 1. In the embodiment shown, the computing server 130 includes an identification engine 210, a conversion engine 220, an execution engine 230, a cache engine 250, a tracking engine 260, and a data store 270. In other embodiments, the computing server 130 includes different or additional elements. In addition, the function of the computing server may be distributed among the elements in a different manner than described.

In some embodiments, the identification engine 210, the conversion engine 220, the execution engine 230, the cache engine 250, and the tracking engine 260 execute machine instructions stored in the data store 270 using one or more processors to enable execution of different processes or transaction types as mentioned in the present disclosure, and to manage the data stored in the data store 270.

The identification engine 210 may receive a query, authenticate the user who sent the query, and validate the query syntax. The identification engine 210 may provide security and prevent processing of malformed or unauthorized queries. In some embodiments, the identification engine 210 may provide the tools to analyze a query received by the computing server and determine different parameters associated with the received query. The identification engine 210 can identify a first interface of a plurality of interfaces on which to execute the query.

In some embodiments, the identification engine 210 determines the appropriate interface(s) and target system(s) to use for query execution. Upon receiving a query, the identification engine 210 extracts information from it, such as the query itself, user identification, authentication tokens, and any additional parameters or metadata. Based on this information, the identification engine 210 then identifies the target systems that are suitable for processing the query. The identification process may involve analyzing the query's structure, keywords, or data source requirements to select the appropriate target systems that can satisfy the query. By choosing the right target systems and their corresponding interfaces, the identification engine 210 may provide that the query is directed to the most relevant data sources and that it can be executed effectively and efficiently.

The conversion engine 220 converts the query into a format suitable for use with the identified interface(s). One of the purposes of the conversion engine 220 is to ensure that user queries are translated into the appropriate formats required for execution on the identified interface(s) and target system(s). Advantages of converting a query into suitable formats for each target system can include streamlined user experience, centralized management, consistent data access, improved security, enhanced optimization, simplified maintenance, reduced network overhead, and increased scalability. These benefits can lead to a more efficient, secure, and user-friendly system.

In some embodiments, the conversion engine 220 may convert the query into a standardized predicate expression data instance, and apply logical transformation rules to remove redundancies and simplify the standardized predicate expression data instance. The conversion engine 220 may generate a hierarchical structure, such as a lazy data object iterator tree, based on the predicate expression data instance or an optimized version of the predicate expression data instance. Advantageously, the conversion engine 220 may create a unified, optimizable representation of the query logic, improve query efficiency by eliminating unnecessary operations before execution, and provide an execution plan that prioritizes selective operations and enables "lazy" evaluation. The conversion engine 220 may further process the hierarchical structure of the query to formulate key prefixes and search parameters. In some embodiments, the conversion engine 220 may leverage a key-value store's prefix search capabilities to reduce the number of database accesses required when a search is performed.

The execution engine 230 may execute the processed version of the query (by the conversion engine 220) on target data stores such as key-value stores. Some of the function of the execution engine 230 include interacting with the data stores in a way that optimizes performance and reduces resource usage. The execution engine 230 may prepare for interaction with an identified data store by setting up authentication for secure access, establishing network connections to the data store, and initializing any necessary resources or data structures. The preparatory steps may provide that all required connections and permissions are in place before any data retrieval begins for efficient query execution.

In some embodiments, the execution engine 230 may establish a connection with a key-value store where index entries are located. The execution engine 230 may provide specialized techniques to optimize data retrieval from the key-value store. In some embodiments, based on search data provided by the conversion engine 220, the execution engine 230 may identify which index entries are relevant to the query. This process may provide for targeting only the relevant parts of the index, rather than scanning the entire index structure. The execution engine 230 may use the key-value store's prefix search capabilities to quickly locate relevant index entries. This may be done by comparing the prefix of each given key in the search data to the set of index entries in the key-value store.

In some embodiments, the execution engine 230 may iteratively search through the set of index entries in a predefined order. This ordered approach may provide that all relevant keys within the search data are considered. When a given key matches an entry in the set of index entries, the execution engine 230 may access the corresponding data object in the key-value store. Both the matched key and its corresponding data object may then be added to a result dataset. By using this index-based approach, the execution engine 230 may quickly identify relevant data objects without scanning the entire dataset. This approach may significantly reduce time and computational resources required for query execution. By efficiently using the key-value store's lookup capabilities, execution engine 230 may provide rapid data retrieval, making it particularly well-suited for use in resource-constrained environments or when dealing with large datasets.

The cache engine 250 manages caching of previously executed queries and their results to improve the system's performance by reducing the need for repetitive processing of frequent queries. In one embodiment, the cache engine 250 may store the query results in the data store 270 of the computing server. This approach may provide for the rapid retrieval of cached results, reducing response times for frequently executed queries.

The cache engine 250 may utilize a network of cache servers or nodes to store and manage the cached queries and results. This approach may provide for increased scalability for data management, as the cache storage capacity can be expanded by adding more cache servers or nodes to the network. Distributed caching may provide optimal performance and load balancing across multiple cache storage locations.

The tracking engine 260 may provide users to track, compare, and/or revert their queries or any changes made over time. In one embodiment, the tracking engine 260 may manage query histories and changelogs stored in the data store 270. Users can access the tracking engine to review, compare, and revert their queries as needed. This centralized architecture may provide for maintenance of all query versions and associated metadata at a single location, which can enable easy and convenient review or auditing.

The data store 270 may include one or more computer-readable media that store data associated with the system, such as query execution results, user profiles, and other pertinent information. Query execution by the computing server may produce results from multiple target systems. The data store 270 may be responsible for retaining these results, facilitating further processing by other components. The data store 270 may save user profiles, preferences, access levels, and other relevant information that enables personalized and secure experiences for each user. By maintaining user information, the system can determine the appropriate scope of access for executing queries, respecting security and permission boundaries.

When the cache engine 250 manages caching of previously executed queries and their results, the data store 270 can serve as a storage location for this cached data. This may provide quick access and retrieval of previously executed queries, reducing redundant processing and enhancing system performance.

The data store 270 can integrate with the tracking engine 260 to store query histories, changelogs, and metadata. This centralized storage for tracking and control-related data may provide users to locate, compare, and revert specific changes easily, helping maintain efficient version control throughout the system.

Example Method for Executing a Query

FIG. 3 is a flowchart depicting an example process 300 for executing a query, in accordance with some embodiments. Various steps in the process 300 may be performed by the conversion engine 220, the execution engine 230, or any other engines of the computing server 130 of FIG. 2. Various processes may be implemented as one or more software algorithms. The software algorithm may be stored as computer instructions that are executable by one or more general processors (e.g., CPUs, GPUs). The instructions, when executed by the processors, cause the processors to perform various steps described. In various embodiments, one or more steps described may be skipped or changed. A computer-implemented method (or process) may be performed by the computing server 130, although the process may also be performed by another suitable computer or combination of computers.

At 310, the computing server 130 receives a query. In one embodiment, a user submits a query through a user device (e.g., a web application, desktop application, or mobile app) connected to the computing server. The user device sends the query to the computing server. This transmission often takes place using a communication protocol, such as HTTP, WebSocket, or other suitable protocols that facilitate data exchange between the user device and the server. Upon receiving the query, the computing server may first check the user's authentication and verify her access rights. This step could involve confirming the user's credentials, such as through an authentication token or a username and password. The server then proceeds to validate the query, ensuring it adheres to the proper syntax and structure for processing. This step may include checking for any malformed, incomplete, or ambiguous elements within the query. After authentication and validation, the computing server forwards the query to the appropriate engine or component for further processing.

At 320, the computing server 130 converts the query into a predicate expression data instance. A predicate expression may be a logical statement that can be evaluated as either true or false. For example, in a query like "find all users where age >30", "age >30" is a predicate expression. Predicates may include comparisons (e.g., $=$, $<$, $>$, $\leq$, $\geq$, $\neq$), logical operations (AND, OR, NOT), or other conditions specific to the data being queried. A predicate expression data instance may be a data structure of the logical conditions in the query. It may represent the query's predicates and their relationships in a format that is optimized for further processing and evaluation.

The predicate expression data instance may include nodes representing variables and predicates from the query, and arcs connecting the nodes to represent logical relationships between the variables and predicates. The nodes may serve as building blocks, each representing a specific element of the query. These nodes can be of two types: variable nodes, which represent the attributes or fields being queried (such as age or name), and predicate nodes, which represent the operators applied to these variables (such as ">" or "=" in the predicate expressions 'age >30' or 'name='Alice'"). The relationships between these nodes may be represented by arcs, which are the connections or edges in the tree structure. These arcs may capture the logical flow and dependencies within the query. For instance, an arc may connect two predicate nodes with an AND relationship, indicating that both conditions must be true, or with an OR relationship, indicating that either condition can be true. This tree-like structure, with its nodes and connecting arcs, may provide a representation of the query's logic.

The computing server 130 may convert the query into the predicate expression data instance by parsing the query using a predefined structure; identifying one or more predicates within the query; and generating the predicate expression data instance as a data structure to represent the logical relationships between the identified predicates.

The computing server 130 may further process the generated predicate expression data instance to remove redundancies by iteratively applying a set of logical transformation rules to the predicate expression data instance until a fixed point is reached where no further optimizations can be made. The logical transformation rules may include removing redundant predicates; eliminating double negations; simplifying logical expressions; and/or combining identical subexpressions or conditions connected by logical AND or OR operations.

At 330, the computing server 130 generates an iteration tree based on the predicate expression data instance. The iteration tree may be a hierarchical data structure. The iteration tree may a blueprint for efficient query processing. The iteration tree may include nodes representing specific operations or data access steps, with leaf nodes corresponding to atomic expressions translated into key-value store operations, and internal nodes representing set operations that combine results. The structure of the iteration tree may represent both the logical relationships within the query and optimizations for efficient execution. In some embodiment, the iteration tree may be designed to prioritize more selective operations, incorporate key-value store-specific optimizations. In some embodiments, the iteration tree may convert the query logic into a concrete, optimized plan tailored for efficient execution in the key-value store environment.

The computing server 130 may generate the iteration tree by transforming the predicate expression data instance into a hierarchical structure of iterator nodes. This process may include converting each predicate from the predicate expression data instance into a corresponding iterator node and arranging these nodes in a way that preserves the logical relationships present in the original predicate expression. The resulting tree structure may represent the query's logic while also providing a framework for efficient query execution in the key-value store.

In some embodiments, the computing server 130 may generate the iteration tree based on the predicate expression data instance by generating a lazy data object iterator tree based on the predicate expression data instance. A lazy data object iterator tree may be a specialized form of iteration tree designed to optimize query execution in key-value stores. It may be characterized by its "lazy" evaluation approach, which defers data retrieval and processing until absolutely necessary. The lazy data object iterator tree structure may include iterator nodes that represent operations on data objects, but instead of immediately executing these operations, it sets up a plan for how and when to access data. The tree prioritizes more selective predicates, potentially reducing the overall amount of data that needs to be processed. It may be designed to minimize unnecessary database reads by leveraging a layered data access approach: first checking cached data, then using index entries, and only performing full data scans as a last resort. This lazy evaluation strategy may be beneficial in resource-constrained environments, as it optimizes both memory usage and processing power by only retrieving and processing data as needed during query execution.

In some embodiments, the lazy data object iterator tree may optimize query execution through two strategies: predicate prioritization and lazy evaluation. It may prioritize the execution of a first type of predicates, typically those that are more selective or can be efficiently processed using available indexes, positioning them strategically within the tree for early evaluation. This may help to quickly narrow down the dataset. It may also implement lazy evaluation, which defers data retrieval and processing until absolutely necessary during query execution. Rather than fetching all potential data upfront, the computing server 130 may only access and evaluate data when a specific branch of the tree is explored. This combined approach of prioritization and lazy evaluation may reduce unnecessary data operations, minimizing resource usage and enhancing performance, especially in resource-constrained environments or when dealing with large datasets in key-value stores.

At 340, the computing server 130 determines search data based on the generated iteration tree. The search data may include the set of key prefixes and search parameters derived from the generated iteration tree. These key prefixes may be strategically formulated to leverage the key-value store's efficient prefix search capabilities. The search data may be determined by analyzing the predicates and their relationships within the iteration tree, prioritizing more selective conditions, and considering the structure of the key-value store's indexing scheme. It may include simple key prefixes for exact matches, range prefixes for inequality conditions, and composite prefixes that combine multiple sub-expressions. The search data may be provided to reduce the number of database accesses required, optimize the use of available indexes, or efficiently cover the query's conditions.

The computing server 130 may determine search data based on the generated iteration tree by traversing the iteration tree to identify predicate nodes; for each identified predicate node, evaluating the predicate to determine an operation on an indexed attribute in the key-value store, and responsive to predicates operating on indexed attributes, formulating a key prefix by using a name of the indexed attribute as a prefix base, and appending, to the prefix base, a value or range based on the predicate's condition; and compiling a dataset of search data, the dataset of search data including the formulated key prefixes.

In some embodiments, the computing server 130 may determine search data by traversing the iteration tree, identifying predicate nodes, and evaluating each predicate for operations on indexed attributes in the key-value store. For predicates operating on indexed attributes, the computing server 130 may formulate (or generate) key prefixes by using the indexed attribute's name as a base and appending appropriate values or ranges based on the predicate's condition. This process may result in a compiled dataset of search data, including the formulated key prefixes, which may be optimized for efficient searching in the key-value store's indexed structure.

The computing server 130 may provide the search data compilation process by estimating the selectivity of each formulated key prefix and assigning priorities based on these estimates and the key-value store's characteristics. The resulting dataset of search data may include the formulated key prefixes, ordered according to their assigned priorities, thus optimizing the subsequent search process in the key-value store.

At 340, the computing server 130 accesses a set of index entries of the key-value store. The set of index entries may provide a lookup mechanism, organizing and storing key-value pairs in a way that enables quick access to data based on specific attributes or conditions. The set of index entries may include entries where the keys are constructed from indexed attributes of data objects, in a format that supports prefix-based searches. Each entry in the set of index entries may point to the location of the corresponding full data object in the key-value store. The key-value store may be a data store 150 of FIG. 1. The set of index entries may allow the system to quickly identify relevant data objects without scanning the entire dataset, significantly improving query performance, especially for operations including indexed attributes.

The computing server 130 may access the set of index entries by communicating to the data store (e.g., key-value store) where the index entries are located. The computing server 130 may identify the set of index entries based on attributes referenced in the determined search data. This process may provide that the computing server 130 targets the correct index entries for efficient query processing.

At 360, the computing server 130 searches the set of index entries based on the search data by comparing a prefix of a given key of the search data to the set of index entries. Responsive to the given key matching an entry of the set of index entries, the computing server 130 may access a data object corresponding to the given key in the key-value store and adding the given key and its corresponding data object to a result dataset.

For example, the computing server 130 may initiate the search process by examining the set of index entries using the previously determined search data. This may include a systematic comparison between the generated prefix keys in the search data to quickly locate relevant index entries. This prefix-based search strategy may leverage the KV store's efficient lookup capabilities, allowing for quick identification of potentially relevant data entries.

When a match is found, the computing server 130 may add both the matched key and its corresponding data object to a result dataset. This result dataset may gradually accumulate all the entries that satisfy the query conditions, forming the basis of the query's output.

In some embodiments, the computing server 130 may iteratively search the set of index entries in a predefined order until all keys within the search data are considered and compiling the result dataset.

At 370, an indicator associated with the result dataset is displayed. In particular, after the result dataset is generated, the computing server 130 can display the indicator associated with the result dataset on a graphical user interface (GUI) of the user's device. In some embodiments, the indicator may be a visual element that shows the status of the search results, such as a summary of the search results, a completion percentage or a "results ready" notification. The summary of the search results may be the number of items found or a brief overview of the data. In some embodiments, the indicator may be an interactive element allowing users to explore or manipulate the result dataset. The GUI is in communication with the computing server 130. Responsive to receiving the indicator associated with the result dataset, the GUI may prepare it for display. In some embodiments, the GUI may format the result dataset in a user-friendly manner, converting raw data into a more readable and comprehensible format. This may include transforming data types, applying formatting rules for dates, numbers, text, sorting or grouping data based on the user's needs. The GUI may create visual elements to display the results effectively. This may include tables, charts, graphs, lists, or other visual representations that best suit the data types and requirements of the specific use case.

Exemplary Embodiments

KV stores are popular due to their simplicity, performance and scaling behavior. As opposed to relational database systems or object stores, KV stores operate on a lower level that is usually schema free. The key of a KV store is a reference to the data of interest which is represented by the value. In contrast to relational databases, KV stores may have the advantage that data can be more easily partitioned/fragmented/shared because it is usually less entangled.

Database systems such as relational databases or object stores may provide high-level query languages to operate with the data. They may have schemas, dedicated indices, primary and foreign keys to model relationships. KV stores may provide a more simplistic API to operate and work with the data by means of key prefix search and database iterators: an iterator can access a dataset by means of a key (prefix) that returns the subset of the data (key-value pairs) that matches the defined key. These searches may be very fast when performed in isolation. However, more complex queries that require the combination of multiple iterators may be expensive without optimizing the underlying query to reduce database reads.

The methodology laid out in the present disclosure may support the implementation of higher-level query languages such as domain-specific languages (DSLs) to access KV stores providing efficient read accesses by utilizing key prefix search with as little (performance and architectural) overhead as possible.

KV Stores

A KV store is a data store that organizes data in terms of keys (references to data) and corresponding values. The key is used to address/retrieve and find the data in the database and to index the data. A KV store can be described as a set of 2-tuples $E=K \times V=\{(k_1, v_1), \ldots (k_m, v_m)\}$ where E is the set of all KV entries is the Cartesian product of the key set K and the value set V. Every 2-tuple refers to a KV entry $e=(k, v)$ with a key component $k \in K$ and a value component $v \in V$, respectively.

The value can be (over) written by means of a put function with put $(k, v)$ which writes a new entry to the database or overwrites an existing one that uses the same key. Data can be retrieved by means of the key get$(p, E)=\{(k, v) \in E | k=p\}$. Many KV stores offer efficient key prefix searches. A prefix function pfx$(p, k)$ may return true if p is a prefix of k. With prefix search, provided a prefix $p=p_1 \ldots p_l$, for all those KV entries $e=(k, v)$ with $k=k_1 \ldots k_m$ and $1 \leq l \leq m$ for which $p_x=k_x$ with $1 \leq x \leq l$, pfx$(p, k)$ would evaluate to true. KV stores may offer a dedicated seek operation/function for this which we could define as seek$(p, E)=\{(k, v) \in E | pfx(p, k)\}$ which returns all those entries whose key is prefixed with p; get$(p, E)$ can be considered as a special case of seek$(p, E)$ with $p=k$. The KV stores may store the keys and values in their stringified form. The KV stores may also store the keys and values as byte arrays.

Data Objects

A data object may be a collection of attribute values indexed by a finite set of attribute labels A. Furthermore, for each object $o \in O$, and label $\alpha \in A$, the value, written $o_\alpha$, may be restricted to a prescribed domain, $D_A$.

Data objects can be written o=(a: $o_a$, a': $o_{a'}$, a": $o_{a''}$, . . . ) where a denotes the attribute and $o_\alpha$ denotes the corresponding value. We use attribute (o)=(a', a", . . . ) to get access to the attributes of o.

It may be assumed that every data object has a key attribute that uniquely identifies a data object globally in the KV store. This attribute may be referred to as the data object identifier. For simplicity, it may be assumed that the attribute $\alpha_{id}$ and attribute value $o_{\alpha_{id}}$ refer to the label and value of the data object identifier, respectively.

Selector Operator

Most of the query languages and/or API may be based on relational algebra. The query language may provide a mechanism to define a generalized selector operator which is defined as $\sigma_{Cond}(O)=\{o \in O | Cond(d)\}$ where O is our set of data objects and Cond denotes a propositional formula n which is applied on a data object; for a data object to be added to the result set, Cond has to evaluate to true.

Data Iterators

Data Iterators may provide sequential access to objects in the database. An iterator may be defined by means of the iter operator $iter_\Psi(p, E)=seek(p, E) \cap \nabla_\Psi(E)$ with $\nabla_\Psi(E)=\{e \in E | \Psi(e)\}$ where $\Psi$ denotes a boolean filtering function.

In summary, an iterator selects entries based on the provided prefix p by means of seek; whether or not entries should be added to the result set is decided based on a custom boolean filtering function $\Psi$. $\nabla_\Psi(E)$ represents the custom logic that is implemented in every iterator to decide what elements are relevant and should be added to the ordered result set. For iterators without custom logic, we simply write iter(p, E)=seek(p, E).

Note that the high-level definition of iterators may be sufficient to convey the working principle of some of the methodologies in this disclosure. In practice, however, iterators may have some additional properties not captured with the formalism: iterators my provide sequential access to elements for which they keep internal state; the order in which the iterator accesses data may be dictated by the sorting order of the data entries in the KV store; and iterators may be "lazy" such that the database is only accessed when data is explicitly requested.

Iterator Composition by Means of Set Operations (Branch Iterators)

Figure 4:
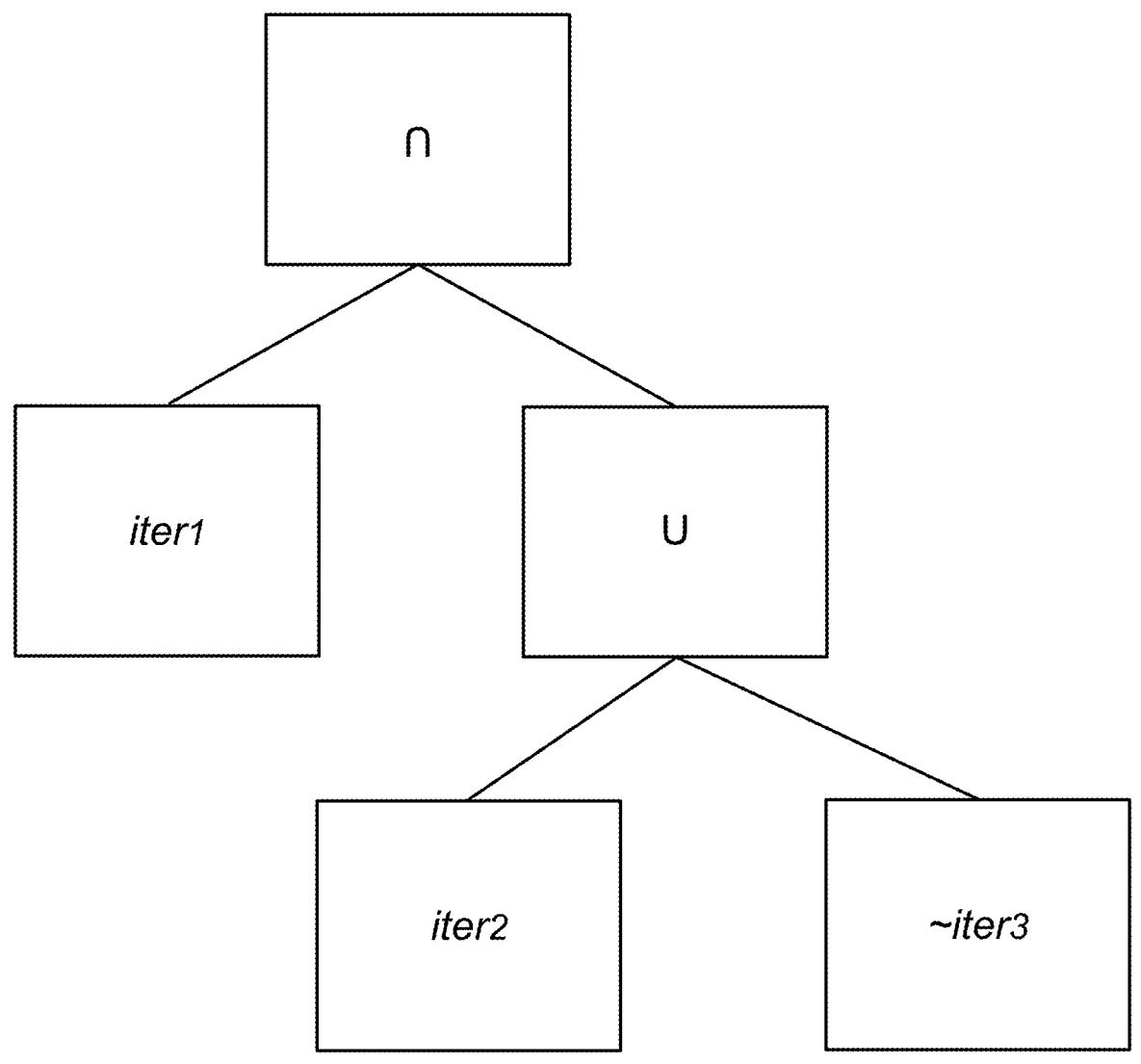
FIG. 4 illustrates an example of an iterator tree, according to one embodiment.

As iterators may produce result sets, they may be composable by means of set operations. Conceptually, this is very similar to expression trees that are derived from generalized selection operators as known them from relational databases. An iterator expression can be written as $iter_{\Psi_1}(p_1, E_1)$ op $iter_{\Psi_2}(p_2, E_2)=(seek(p_1, E_1) \cap \nabla_{\Psi_1}(E_1))$ op $(seek(p_2, E_2) \cap \nabla_{\Psi_2}(E_2))$ where op is a standard binary set operation such as union or intersection. Unary set operations such as complement can also be applied to operators $\sim iter_\Psi$ (p, E). FIG. 4 is an example of an iterator tree formed from the iterator expression $iter_1 \cap (iter_2 \cup \sim iter_3)$.

Conjunctive Normal Form (CNF)

CNF may be a standardized form of representing Boolean logic formulas in propositional logic.

A literal may be either a propositional variable P or negated propositional variable ¬P. A clause may be a (possibly empty) disjunction of literals. A formula is in CNF if it is a conjunction of disjunctions of literals.

Basic Iterator Language

To introduce lazy data object iterator trees, a basic language may be considered, the syntax of which is introduced below. Some countable set of variables may be provided; numerals or labels may not be further defined:

```
n ∈ Num          Number
l ∈ Lab          Labels
a ∈ A            Attributes
L                Set Literals
  < Result > ::= < Result > < SetOperator > < Result >
               | evaluate (< Iter >)
               | L
  < Atom > ::= a | n | l
  < LogicalOperator > ::= ^|∧| V
  < SetOperator > ::= ∩| ∪
  < ComparisonOperator > ::= > | < | ≥ | ≤ | = | ≠
  < Predicate > ::= < Predicate > < LogicalOperator > < Predicate >
               | < Atom > < ComparisonOperator > < Atom >
  < Iter > ::= < Iter > < SetOperator > < Iter >
             | iter (< Predicate >, < Iter >)
             | iter (< Predicate >)
```

Predicate Expression Data Instance

In the present disclosure, the terms "predicate expression data instance" and "predicate expression tree" are used interchangeably.

In some embodiments, a predicate expression data instance may be a hierarchical representation of a propositional formula. A predicate expression data instance may be defined as follows. There is a node (drawn as a rounded rectangle) for every variable x∈X where X denotes the set of variables. A variable can be a number, attribute or (string) label. There is a node (drawn as a straight rectangle) for every predicate/condition c∈C where C denotes the set of all predicate/conditions. For every predicate/condition c and for every variable x in the scope of c, there is an arc <c, x>. For every predicate p and for every other predicate c' in the scope of c, there is an arc <c, c'>.

Figure 5:
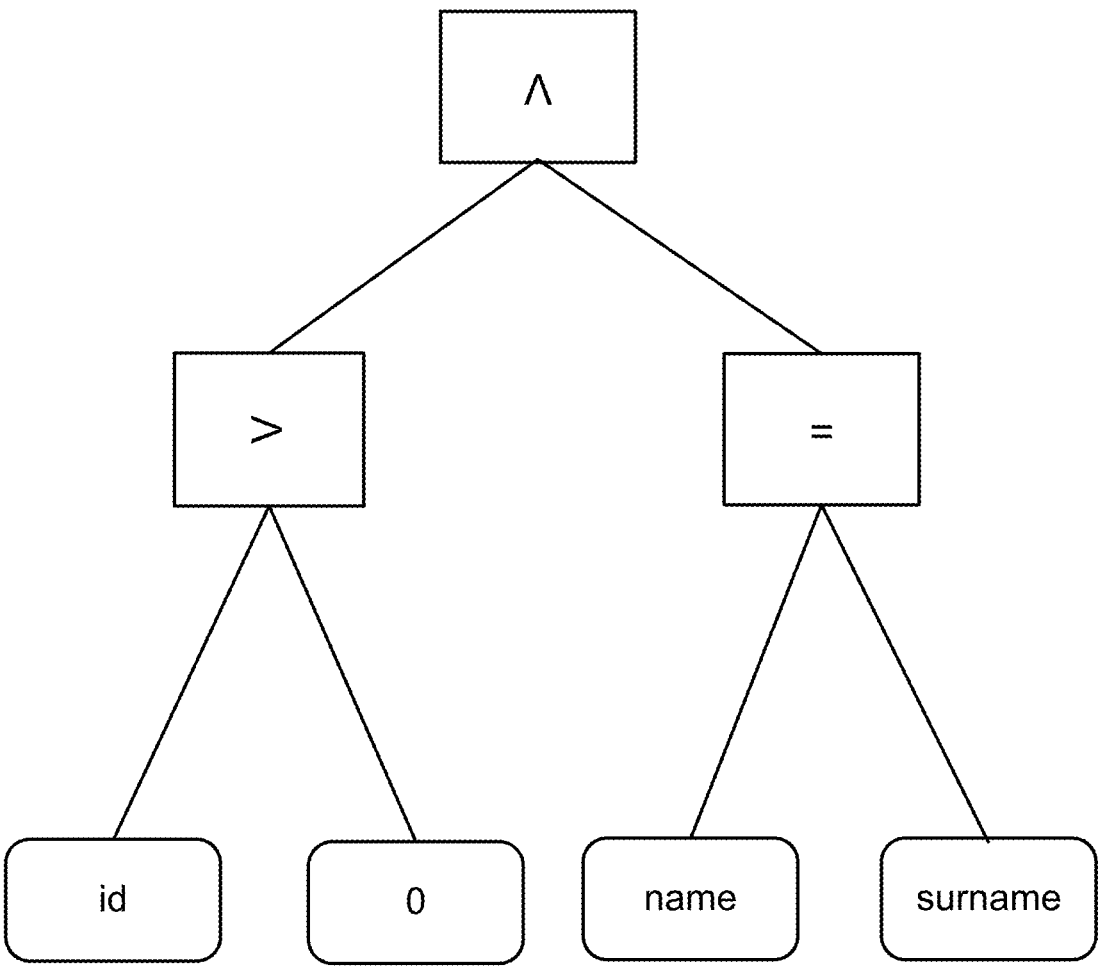
FIG. 5 illustrates a predicate expression data instance, according to one embodiment.

FIG. 5 depicts a predicate expression data instance derived from the propositional formula id >0 ∧ name=surname.

KV stores may rely on a simplistic data model and simplistic (low-level) ways to access the data which is often provided by means of iterators. The absence of higher level abstractions with regards to data layout and APIs as known from relational databases, document stores, or object database may be a strength and a weakness at the same time: while their simplicity make KV stores very lightweight and very versatile due to their ease of integration, building higher level APIs for interacting with the store may require significant customization effort depending on the application context.

Some KV stores may mitigate this challenge by providing database management systems (DBMS) or general-purpose abstraction layers that offer support for higher level query languages and indexing. DBMS may offer all the required functionality and interfaces to manage, manipulate, query and store the data in an optimized fashion and perform query optimizations as well. However, DBMS may not be well-suited to run in resource constrained environments and, as they usually consist of many components, they may be difficult to deeply integrate with the main application. The present disclosure may be subject to the following constraints: a high database read/write performance may be needed with as little overhead as possible balancing query execution time, database size, maintenance effort; a deep integration may be needed between the KV store and the main application; and operation may be limited to resource constrained environments with limited processing power and memory.

Some KV stores may offer a more lightweight alternative to DBMS by means of abstraction layers that usually implement a variant of the active record pattern or more generally, the object relational pattern with the difference that they use the KV store as a backend instead of a relational database. However, for high performance applications that may process large amounts of data and may require very fast data access with additional constraints on the overall size of the KV store, these techniques may not always applicable because of the following limitations: redundant data due to fixed indexing; introspection; opaque data-layout; and lack of query optimization. KV stores may use their own indexing scheme that may not be optimized towards the application that is processing the data. This may lead to the storage of potentially redundant data or indices that may not be used or relevant for the application, which may waste storage space. In addition, the fixed indices may not always make the best use of the prefix search capabilities provided by KV stores.

KV stores may use introspection/reflection to automatically infer what object properties should be stored and automatically setup the data-layout with the indexing. This process can be slow for high performance applications. The abstraction layers may be used as black boxes to take the burden of performing the database-layout and indexing from the database-engineer. This can lead to opaqueness with regards to the concrete data-layout. While the layers may offer automation around the creation of the data layout/indexing as well as higher level APIs or query languages to access the data, they may not always provide query optimization strategies.

The present disclosure proposes a computer system that is geared towards a high-performance application in resource constrained environments. The computer systems may be any systems described in reference to FIGS. 1, 2 and 3, including but not limited to the client device 120 and the computing server 130. Advantageously, the computer system may aim to keep data redundancy low by means of selective indexing, not use introspection, provide a transparent data layout and optimize queries with the overall goal of providing fast read access.

The computer system may efficiently retrieve data from, and/or stores/manages data in a KV store in resource constrained environments by devising a generally applicable yet simple strategy to layout KV data that supports quick access to data. The data-layout may divide all KV entries into two sets: index entries to index object properties, and data entries to store data objects to which the index entries refer. The index entries may be structured in such a way that they fully leverage key prefix search. This process may be applied globally on the properties that are deemed to be relevant with regards to indexing (selective indexing).

The proposed computer system may also perform query normalization and query optimization powered by a predicate expression data instance that is generated from an input query. Assuming the input query is based on some form of selector operator, the computer system may convert the query into a standard representation for constraints called a predicate expression data instance on which several optimization steps may be performed. Responsive to generating the predicate expression data instance, the computer system may generate a lazy data object iterator tree. Lazy data object iterator trees may be high-level iterators that prioritize the execution of the most selective constraints first, and reduce the overall KV accesses by only loading a data object once from the database and performing any further constraint evaluation on the loaded object instead of accessing the database again.

Data Layout

With respect to data layout, the computer system may differentiate between data entries $E_D$ and index entries $E_I$ with $E=E_D \cup E_I$, both of which can be stored in the same or in separate KV stores. Data entries may store the actual data object in the database whereas index entries may refer to certain attributes of interest of the data entries.

A data entry may store an entire data object $o=(a: o_a, a': o_{a'}, a'': o_{a''} \ldots)$ in the database so that the k component of a KV entry $e=(k, v)$ that corresponds to o is represented by $k=h(a_{id}) \cdot o_{a_{id}}$ where $\cdot$ denotes (byte array) concatenation; $h(a)$ is a function that maps an attribute label to a corresponding key prefix so that $h(a_{id})$ is a key prefix for the id attribute label and $o_{a_{id}}$ is the actual data object identifier; the v component holds the entire data object o. However, this may only enable the retrieval of data objects by their object identifier and may not enable retrieval of data objects by means of their attributes which may be one of the purposes of index entries.

Index entries may provide quick access to data objects by means of attribute values. For example, responsive to indexing attribute $a \in attributes(o)$ with $1 \leq k \leq |attributes(o)|$ from the tuple of attributes, a k component may be synthesized with $k=h(a) \cdot o_a \cdot o_{a_{id}}$ and the v component $v=o_{a_{id}}$; $o_a$ is the actual attribute value of the data object o that corresponds to $a_k$ and $o_{a_{id}}$ is the id of the data object. One of the purposes of adding $o_{a_{id}}$ is to ensure that k is unique for all attributes and data objects. Index entries may make it possible to quickly retrieve data objects based on attribute values. The data-layout may not require all attributes to be indexed. For the purpose of differentiating between indexed and non-indexed attributes, the indexed(a) operator may be used. The indexed (a) operator may return true if attribute $a \in A$ has a corresponding index entry.

The computer system may store the object:

o=(id: 0, name: "Alice", surname: "Smith", account: 12034)

with

A={id, name, surname, account}

The computer system may define $h(a)=a$ for each a so that the corresponding data entry is $e_{data}=(id0, o)$, whereas the index entry or name may be $e_{index}=(nameAlice0,0)$. Thanks to key prefix search, users may be found by using their name and prefix search. For example, all the users in the database whose names starts with A may be found by using the key prefix nameA. In the present disclosure, data values may be represented as strings and integers for simplicity; but, in a computer implementation, these data values may be stored as byte arrays.

The keys may be sorted so that prefix search also works for attribute values that can be mapped to numbers and/or numeric ranges. This may be the case as many KV stores provide lexicographic ordering of keys. The numbers may be aligned so that lexicographic ordering implies numerical ordering for numeric attribute values.

Predicate Expression Translator

The computer system may implement a predicate expression translator (or converter) that converts the query language or high-level API into a predicate expression data instance. In some embodiments, it may be assumed that the query language or API relies on some instance of a selector expressions $\sigma_{Cond}(O)=\{d \in O | Cond(d)\}$ to formulate conditions on the objects that should be selected/retrieved from the database. In this case Cond(d) can be directly translated to a corresponding predicate expression data instance which we use as the model to perform query normalization and optimization steps.

In some embodiments, the predicate expression data instance may be derived directly from Cond by parsing Cond by means of a <Predicate> non-terminal function and tree pruning function in order to derive the corresponding predicate expression data instance.

Figure 6:
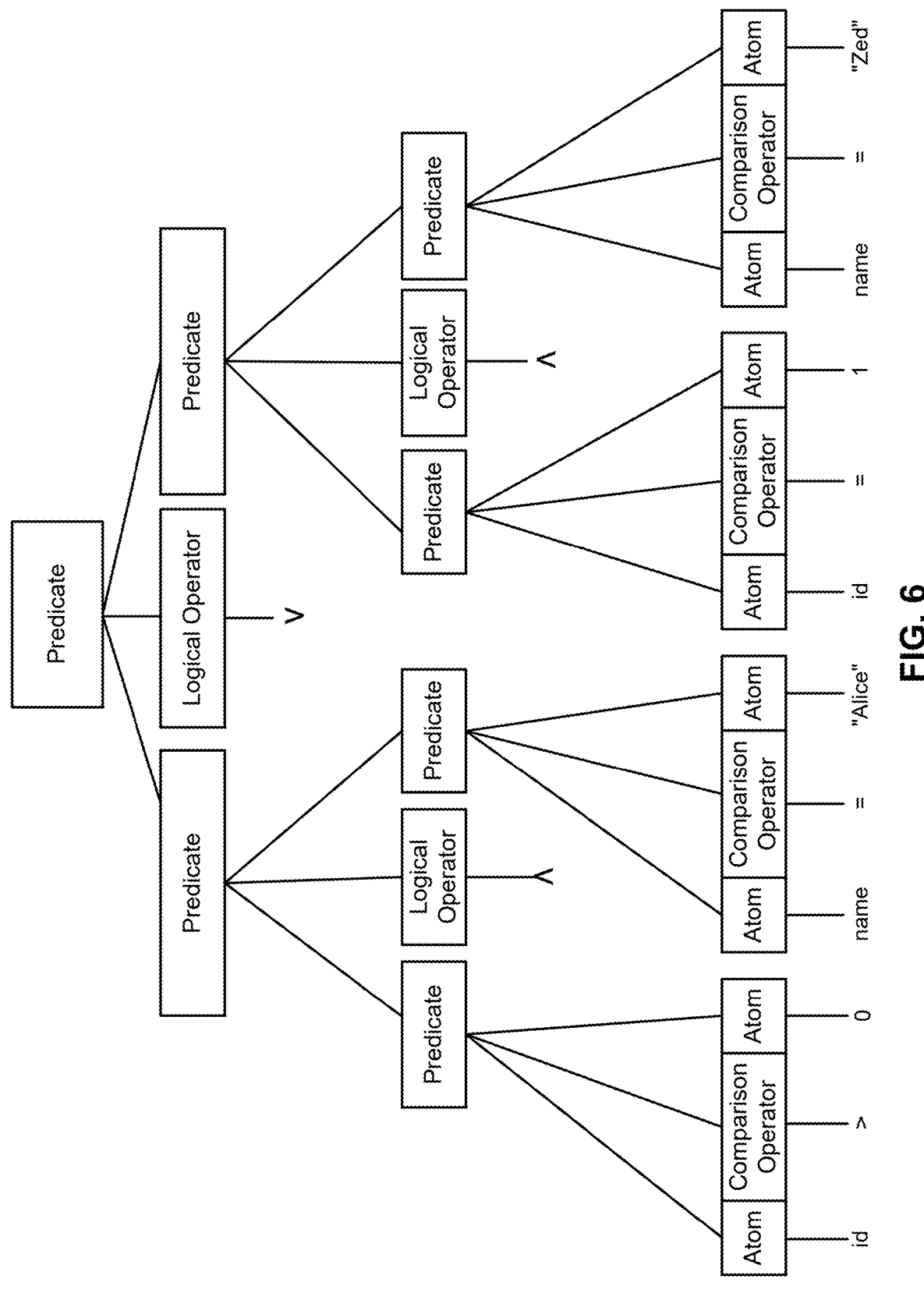
FIG. 6 illustrates a parse tree, according to one embodiment.

An example is provided in the following paragraph: a query language or high-level API formulates a condition to select all the data objects from the KV store by means of $\sigma_{(id>0 \ \wedge \ name="Alice") \bigvee (id=1 \ \wedge \ name="Zed")}$(E) with Cond= (id>0 $\wedge$ name="Alice")$\bigvee$(id=1 $\wedge$ name="Zed"). Parsing Cond by means of the basic iterator language as provided in the present disclosure provides the parsed tree (concrete syntax tree) shown in FIG. 6.

Figure 7:
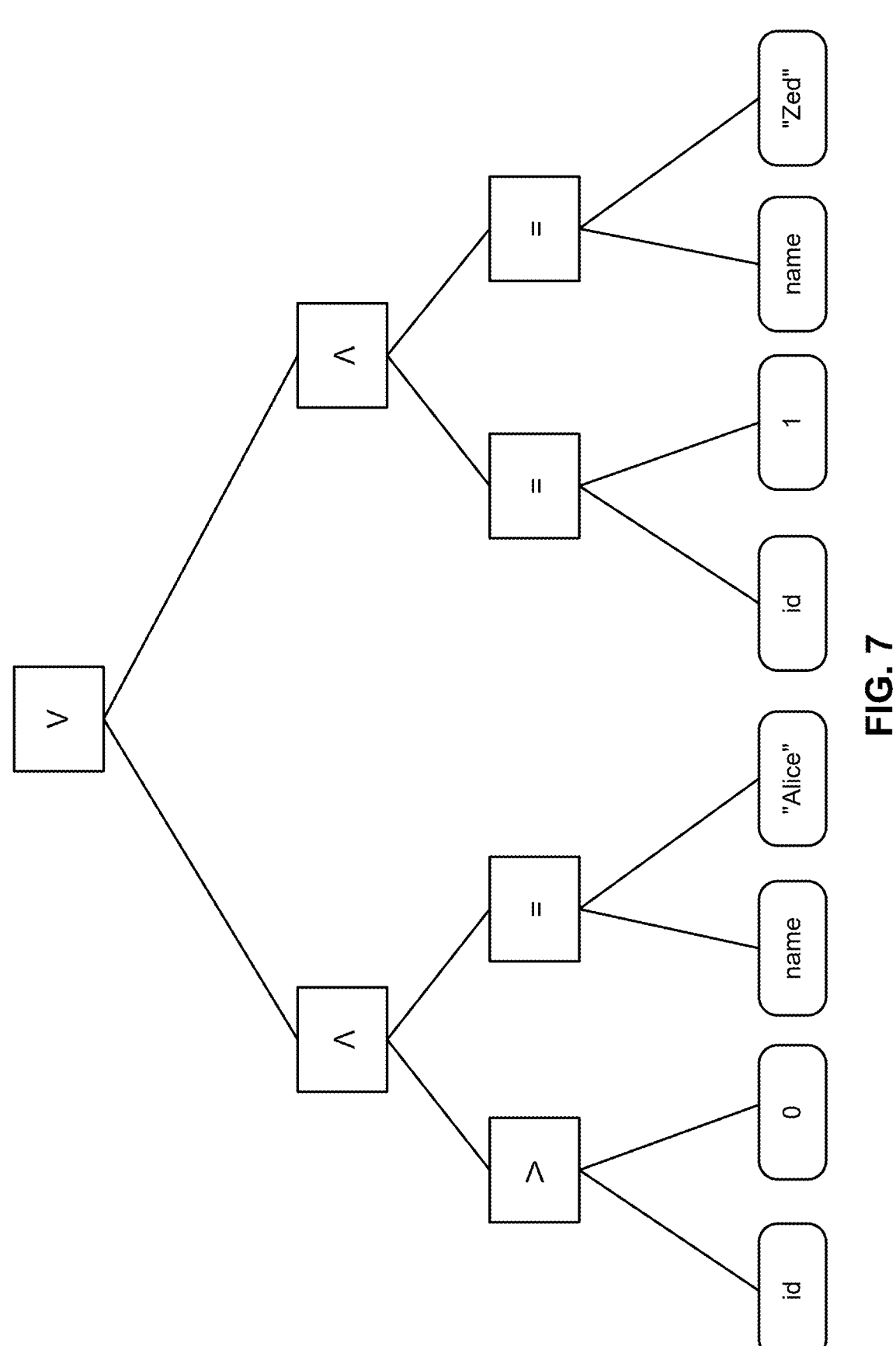
FIG. 7 illustrates an abstract syntax tree, according to one embodiment.

After pruning the tree, an abstract syntax tree may be generated as shown in FIG. 7, which may satisfy the predicate expression data instance definition.

Predicate Expression Normalizer

The computer system may implement a predicate expression normalizer that takes the predicate expression data instance as input in order to normalize it by: removing redundant predicates by deduplicating redundant branches; and eliminating negations. This may be an important optimization because negations can severely impact query time if directly translated into iterators. Instead of converting negations into iterators, the complement may be directly converted into a corresponding iterator.

The steps above may help to simplify the iterator tree construction and are realized by means of the application of the transformation rules below that are based on De Morgan's laws. Based on an assumption that the input query is based on selector expressions which usually do not use equivalence relations or implications, the application of the subset of De Morgan rules below may be sufficient for the present purposes. The rules below may include a left hand side l and right hand side r separated by $\Rightarrow$(l$\Rightarrow$r) where the l pattern is translated into the r pattern:

$\neg$(F$\bigvee$G)$\Rightarrow$($\neg$F$\wedge\neg$G) (push negations downward)
$\neg$(F$\wedge$G)$\Rightarrow$($\neg$F$\bigvee\neg$G) (push negations downward)
$\neg\neg$F$\Rightarrow$F (eliminate redundant negations)
$\neg$T$\Rightarrow\perp$ (Eliminate T and $\perp$)
$\neg\perp\Rightarrow$T (Eliminate T and $\perp$)
F$\wedge$T$\Rightarrow$F (Eliminate T and $\perp$)
F$\bigvee$T$\Rightarrow$T (Eliminate T and $\perp$)
F$\wedge\perp\Rightarrow\perp$ (Eliminate T and $\perp$)
F$\bigvee\perp\Rightarrow$F (Eliminate T and $\perp$)
F$\wedge$F$\Rightarrow$F (Idempotency)
F$\bigvee$F$\Rightarrow$F (Idempotency)

The pseudocode below describes the translation process based on a predicate expression data instance on a very high level. The translate function may apply the transformation rules from above on a predicate/condition c if it matches one of the l patterns and transform it into the corresponding r pattern which is denoted as c' in the pseudocode below. The transformation may be repeated unless and until there is no longer any predicate in the predicate expression data instance that matches any of the l patterns above, i.e., a fixed point is reached.

```
worklist ←{c|c∈c}
while worklist ≠{ }
    select c∈worklist
    worklist ←worklist\c
    c'←translate(c)
    if c'≠c
    worklist←worklist∪{c}
```

Once the normalization is completed using the fixed-point iteration above, another translation pass (or conversion) on the network may be performed to eliminate negation by using a semantically equivalent predicate. The list below just shows some transformation examples.

$\neg$(a>b)$\Rightarrow$a≤b
$\neg$(a<b)$\Rightarrow$a≥b
$\neg$(a≤b)$\Rightarrow$a>b
$\neg$(a≥b)$\Rightarrow$a<b
$\neg$(a≠b)$\Rightarrow$a=b
$\neg$(a=b)$\Rightarrow$a≠b Using CNF As mentioned above, different normal forms may be supported. However, by default the computer system may apply translations to CNF. Some of the advantages of CNF may include the following: if one of the conjunctive clauses does not hold true, the whole predicate does not have to be evaluated further so that it can help us to potentially reduce overall query evaluation time. Another advantage of CNF is that heuristics can be applied with regards to the evaluation order of predicates: as conjuncts are closer to the root of the predicate expression data instance, the computer system may combine the heuristic of giving preference to predicates with a higher selectiveness with the narrowing effect (with regards to the search space) of the $\wedge$ operation.

In addition to the translation rules for negations, the computer system may apply (F$\wedge$G)$\bigvee$H$\Rightarrow$(F$\bigvee$H)$\wedge$(G$\bigvee$H) to push disjunctions downwards.

The conversion to CNF can be expensive and can lead to an exponential increase with regards to the number of clauses so that for cases where a large amount of selector predicates are expected, other normal forms such as negation normal form may be used instead.

Figure 8:
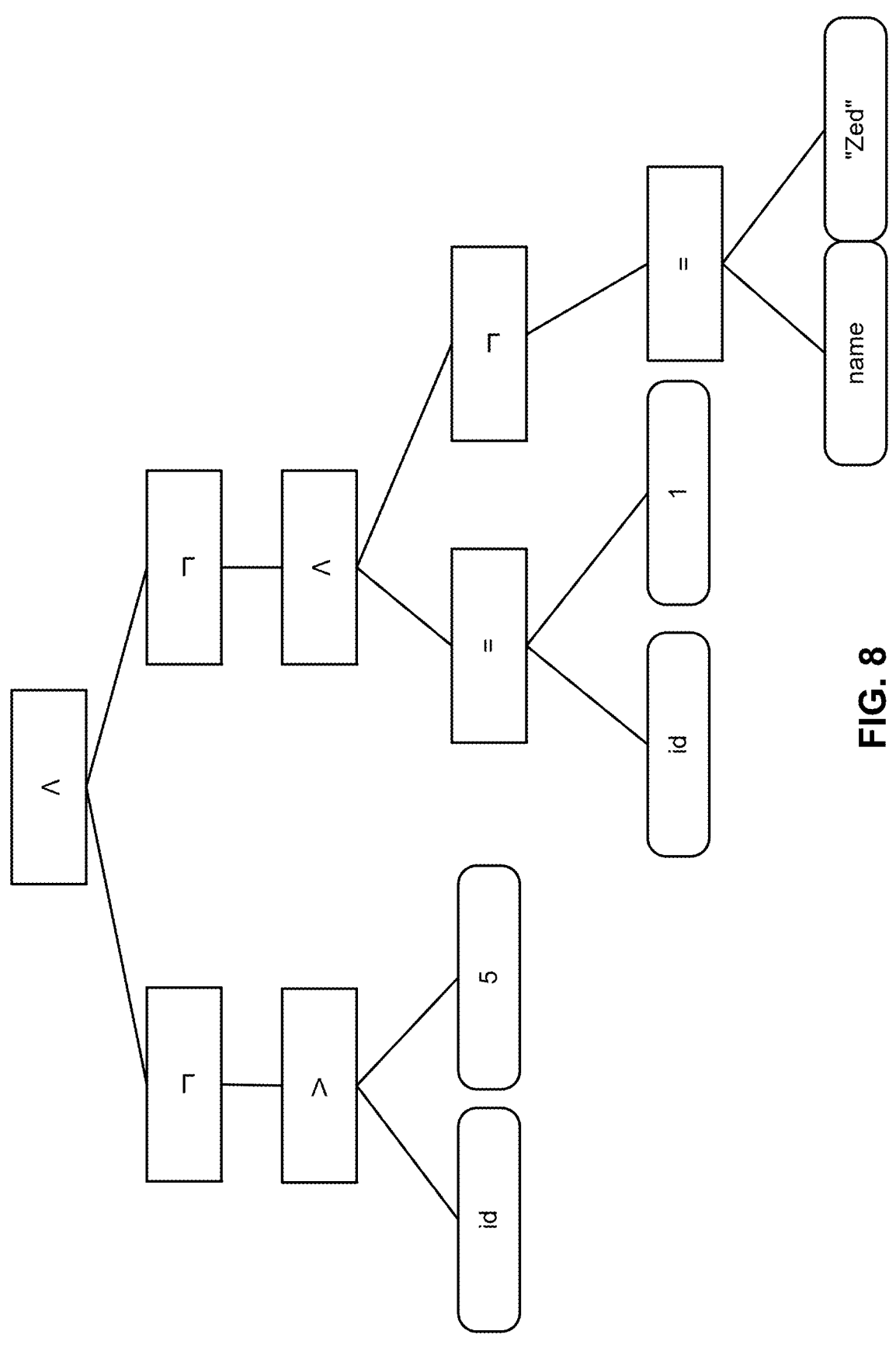
FIG. 8 illustrates a predicate expression data instance, according to one embodiment.
Figure 9:
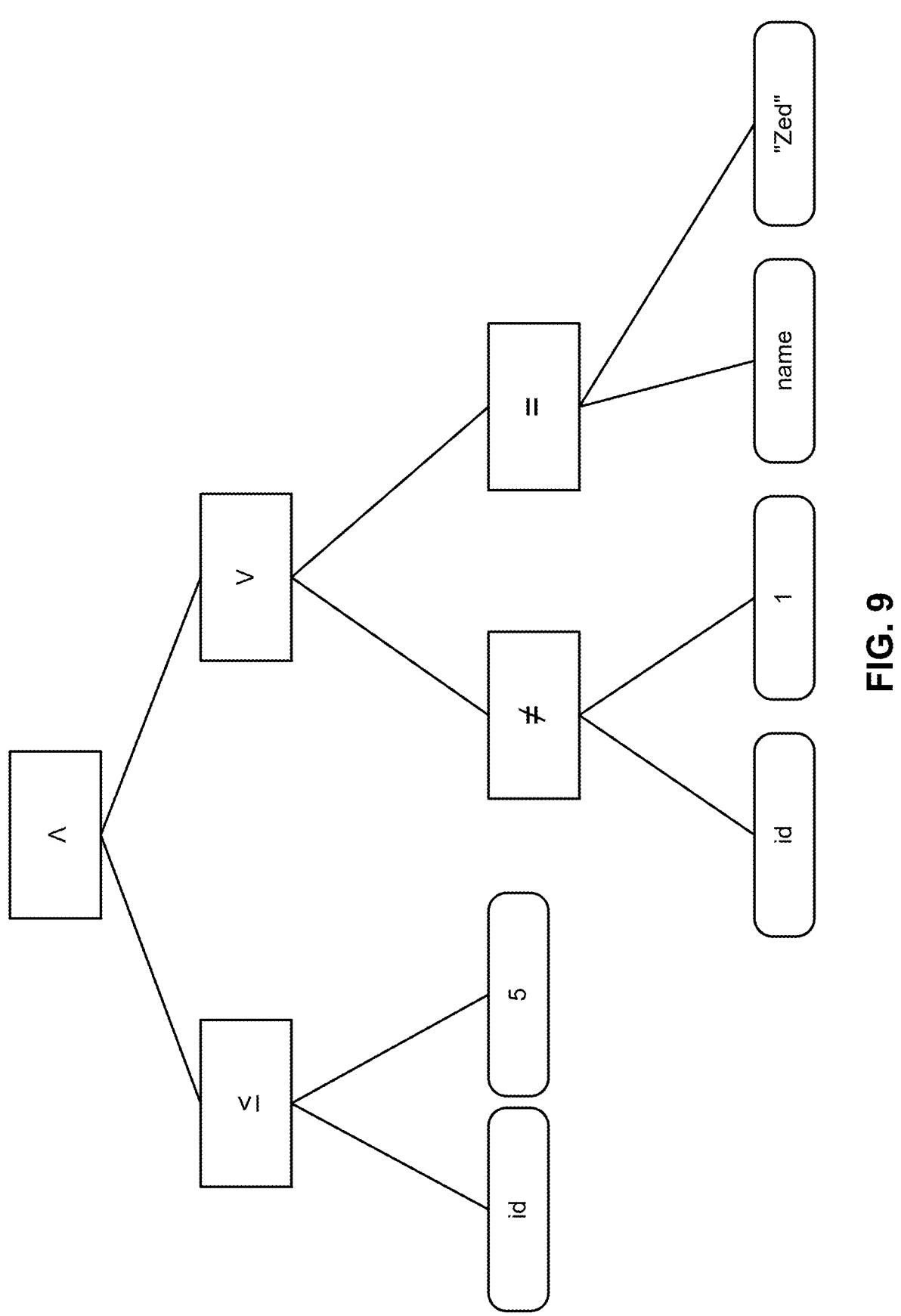
FIG. 9 illustrates the predicate expression data instance in Conjunctive Normal Form (CNF), according to one embodiment.

FIG. 8 depicts the predicate expression data instance that is taken as input by the normalizer. FIG. 8 illustrates a data network that is not in CNF. FIG. 9 depicts the output that is produced by means of the algorithms explained above. In FIG. 9, the expression is in CNF and all the negations are eliminated.

Lazy Data Object Iterator Tree

The computer system may implement a data object iterators (trees) as a high-level data representation that relies on data iterators. Data iterators may be building blocks to interact with data in the KV store directly, whereas lazy data object iterators may work on a higher semantic level. Database iterators may only look at the entries in the KV store as pairs of keys and values, whereas lazy data object iterators may take the database structure into account, and differentiate between data entries that store data objects and index entries that index data object properties. Lazy data object iterators may represent a composition of iterators and, hence, can be viewed as iterator trees. Lazy data object iterators may be data instances of selector operators. They may be highly optimized to work well with KV stores in resource constrained environments by: fully leveraging the key prefix search capability of the KV store; or providing layered data access by means of a defined data layout. The computer system may use three access levels. If the computer system is unable to retrieve data on a higher priority level, it falls back to the next one.

Level 1: If data has already been previously fetched by another iterator, the computer system may use the data-object stored in the data-entry to access the properties instead of leveraging the index entries to fetch this information from the database. The cost of a level 1 access is 0 as no database reads are required.

Level 2: If the data objects are not fetched yet, the computer system can use index entries to quickly retrieve the data objects from the KV store. This access is constrained by already including an attribute predicate of the target objects of interest. The cost of a level 1 access amounts to 2 database reads to retrieve an object from the database.

Level 3: if no database entry has been retrieved yet and the attribute of interest is not indexed by, the computer system may fallback to iterating over all data entries so that the cost of level 3 access can be estimated to $|E_D|$. However, it may be recommended to index all those properties that are relevant to the application in order to avoid level 3 accesses altogether.

Lazy Data Object Iterator Tree Evaluation

The semantic equations depicted below in denotational semantics describe the evaluation of lazy data object iterator trees. The semantic function eval may perform a sequence of one or more expressions that makes up a program with (s, t) as the initial state where s denotes the result set at the current point of execution and t denotes the temporary result or cache set. In the equations below, a denotes a attribute, val denotes a value and c is a propositional formula; the supported operators are $\theta = \{=, <, >, \leq, \geq, \neq\}$. Internally, object iterators can be viewed as "semantic wrappers" around database iterators that implement the actual database/KV store accesses. For simplicity, the computer system may use composition with g=eval[[A]]∘eval[[B]] which is equivalent to g(r)=eval[[A]](eval[[B]](r)). Every semantic function may produce a transform (s, t) ↦ (s', t'); if either is not written, there is no change. evaluate[[T]] denotes the entry-point for the evaluation of a defined iterator trees and can be viewed as the semantic equation for evaluate( ) as described in the basic iterator language provided in the present disclosure.

As input the semantic equation evaluate takes a lazy data object iterator tree T as follow.

1. evaluate[[T]]=transfer∘eval[[T]]
2. eval[[iter($c_1$)∩iter($c_2$)]]=eval[[iter($c_2$)]]∘eval[[iter ($c_1$)]] where $c_1$ has a higher selectiveness as compared to $c_2$
2. eval[[iter($c_1$)∪iter($c_2$)]](s, t)=eval[[iter($c_1$)]](s, t)∪eval [[iter($c_2$)]](s, t)
3. eval[[iter(a θ val)]]=itereval[[a θ val]]
4. eval[[iter($a_1$ θ $a_2$)]]=itereval[[$a_1$ θ $a_2$]]
5. itereval[[a θ val]](s, t):
    if cached (t, a):
        itereval[[a θ val]] with s'={(k, o)∈c|$o_a$ θ val} and t'= ⊘ (Level 1) else if indexed (a):
        itereval[[a θ val]] with t'=collect∘index(a, θ, val) (Level 2) otherwise
        itereval[[a θ val]] with t'={(k, o)∈s|$o_a$ θ val} (Level 3)
6. itereval[[$a_1$ θ $a_2$]](s, t):
    if cached(t, $a_1$)∧cached (t, $a_2$):
        itereval[[a θ $a_2$]] with s'={(k, o)∈t|$o_{a_1}$ θ $o_{a_2}$} and c'= ⊘ otherwise
        itereval[[$a_1$ θ $a_2$]] with c'={(k, o)∈s|$o_{a_1}$ θ $o_{a_2}$}
7. for s⊆$E_l$
    collect(s)={(k, v)∈s|get(h($a_{id}$·v, $E_D$)}
8. for a∈A, val ∈$D_a$, θ ∈{<, >, ≤, ≥, =, ≠}
    index (a, θ, val)={(k, v)∈$E_l$|liter$_{aθval}$(h(a)·val, $E_l$)}
9. for a∈A, t≠⊘ ,t⊆$E_D$
    cached (t,a)=∀(k, o)∈t, ∃$o_a$
10. for t≠⊘ ,t⊆$E_D$
    transfer(s, t)=(s', t') with s'=t and t'=⊘

There may be four variations of eval. Two variations decompose iterator intersection and union, respectively. The intersection decomposition may be implemented in such a way that the evaluation of the more restrictive predicate/ condition $c_1$ is given preference over $c_2$ where the (heuristic) preference list of operators is =, <, >, ≤, ≥, ≠; = is the operator with the highest selectiveness, whereas #has the lowest selectiveness. The other two variants may be applied on iterator that cannot be decomposed any further by invoking the semantic equation itereval.

At a high level, the itereval may first check whether the object for which it wants to check a predicate of the form $a_1$ θ $a_2$ or a θ val has already been fetched from the database (Level 1 access). In case the computer system has not fetched any data from the KV store yet, the index may be leveraged by constructing a data iterator that uses key prefix search by encoding the predicates in terms of an appropriate prefix (and index entry) (Level 2 access).

In case the computer system has not retrieve any data objects yet, and no index is available for an attribute, the computer system may iterate overall data entries in the KV store and perform the attribute checks on them by means of $E_D$ (Level 3 access). This layered data access may be the reason why this type of iterator is referred to as being "lazy".

According to one embodiment, FIG. 10 illustrates entries in a KV store where E denotes the set of corresponding KV entries. The computer system may evaluate the expression iter(name="Alice")∩iter(age >10). The application of the semantic equations from as explained above is illustrated below. L1 and L2 denote Level 1 and Level 2 database accesses, respectively.

evaluate[[iter(name="Alice")∩iter(age >10)]]($E_D$, ⊘ )
    =transfer∘eval[[iter(name="Alice")∩iter(age    >10)]] ($E_D$,⊘ )
    =transfer∘eval[[iter(age               >10)]]∘eval[[iter (name="Alice")]]($E_D$, ⊘ )
    =transfer∘eval[[iter(age               >10)]]∘eval[[iter (name="Alice")]]($E_D$, ⊘ )
    =transfer∘eval[[iter(age               >10)]]∘itereval [[name="Alice"]]($E_D$, ⊘ )
    =transfer∘itereval[[age >10]]∘collect∘index(name, =, "Alice")(L2)
    =transfer∘itereval[[age >10]]∘
    collect({name Alice0: 0, name Alice1: 1}) (L2)
    =transfer∘itereval[[age >10]]($E_D$, {0: (name: Alice, age: 15), 1: (name: Alice, age: 10)}) (L1)
    =transfer∘{(name: Alice, age: 15), ⊘ }
    ={(name: Alice, age: 15), ⊘ }

The cost of accessing the database in the example above may be four because overall there are four database read accesses for scanning through the index entries and fetching the corresponding data entries. In comparison, the naive approach of iterating over all data entries (Level 3 access) and then reusing the results (Level 1 access) would have an associated database access cost of eight. The even more naive approach of only using Level 3 accesses would have an associated cost of sixteen because all data-entries would be re-collected in the two separate branches illustrated above.

Iterator Tree Generator

The computer system may implement the iterator tree generator, which takes the normalized predicate expression data instance as input and generates a lazy data object iterator tree. From the normalized predicate expression data instance, the computer system may generate a (lazy) object iterator tree. The pseudocode for the generation is listed below. The function genOitTree (c) takes as input a (root) predicate/condition c. In one embodiment, the predicate operations takes two operands, c is a triple of the form c=($c_l$, $c_{op}$, $c_r$) where $c_l$ denotes the left-hand side, $c_{op}$ denotes the operation and $c_r$ denotes the right-hand side of the predicate. Furthermore, the set of entries E is present in the key value store.

```
genOitTree(c)
    if c_op = ⌢⋀
        return genOitTree(c_l) ∩ genOitTree(c_r)
    else if Cop = ⋁
        return genOitTree(c_l) ∪ genOitTree(c_r)
    else if c_op ∈ {>, <, ≤, ≥, ≠, =}
        return iter (c_l c_op c_r)
```

Taking the predicate expression data instance $id \leq 5 \wedge (id \neq 1 \vee name="Zed")$ as input, generateIteratorTree (c, E) would generate an iterator tree by recursively calling genOitTree.

genOitTree($id \leq 5 \wedge (id \neq 1 \vee name="Zed")$)
  =genOitTree($id \leq 5$)∩(genOitTree($id \neq 1 \cup name="Zed"$))
  =genOitTree($id \leq 5$)∩(genOitTree($id \neq 1$)∪genOitTree
      (name="Zed"))
  =iter($id \leq 5$)∩((iter($id \neq 1$)∪iter(name="Zed")))

Figure 11:
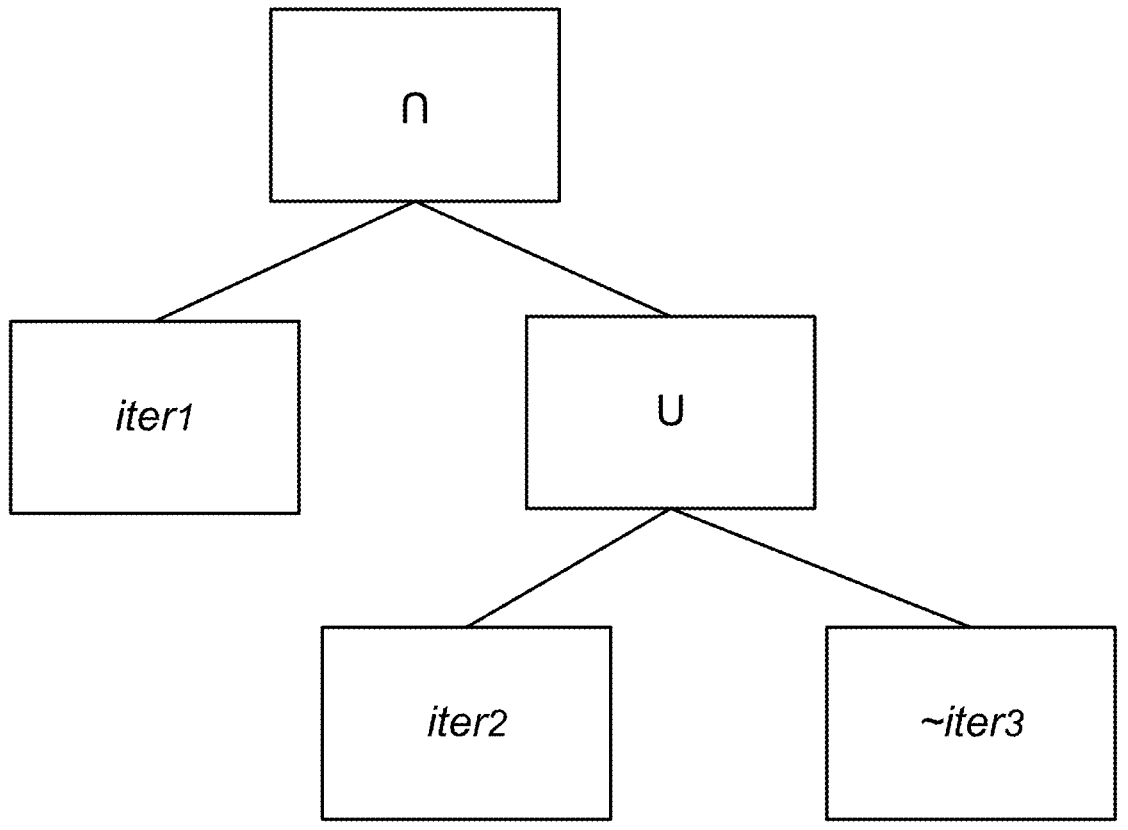
FIG. 11 illustrates a lazy data object iterator tree, according to one embodiment.

The resulting lazy data object iterator tree is depicted in FIG. 11 with
    iter$_1$=iter($id \leq 5$),    iter$_2$=iter($id \neq 1$)    and    iter$_3$=iter
        (name="Zed").

Iterator Tree Evaluation Engine

The computer system may implement the iterator tree evaluation engine, which may take the lazy data object iterator tree and pass it onto evaluate ( ) The iterator tree evaluation engine may apply the semantic equations as described in the present disclosure on evaluate(iter($id \leq 5$)∩((iter(id $\neq 1$)∪iter(name="Zed")))).

In some embodiments, a high-level query maybe provided as a selector operator of the form $\sigma_{id>0 \vee (id=3 \wedge name="Zed")}$ (E). The predicate expression translator may generate the predicate expression data instance as shown in FIG. 12.

Figure 12:
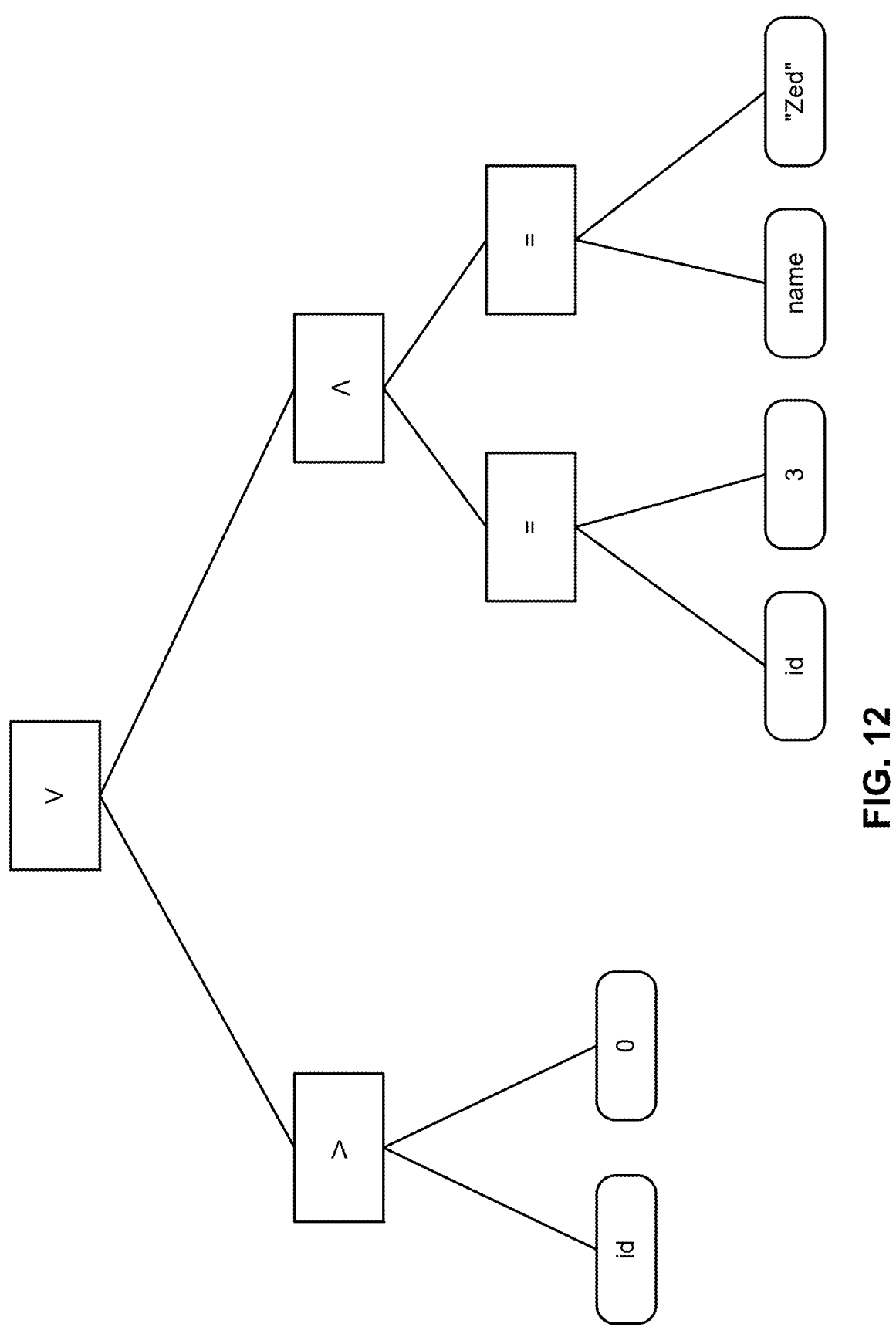
FIG. 12 illustrates a predicate expression data instance, according to one embodiment.
Figure 13:
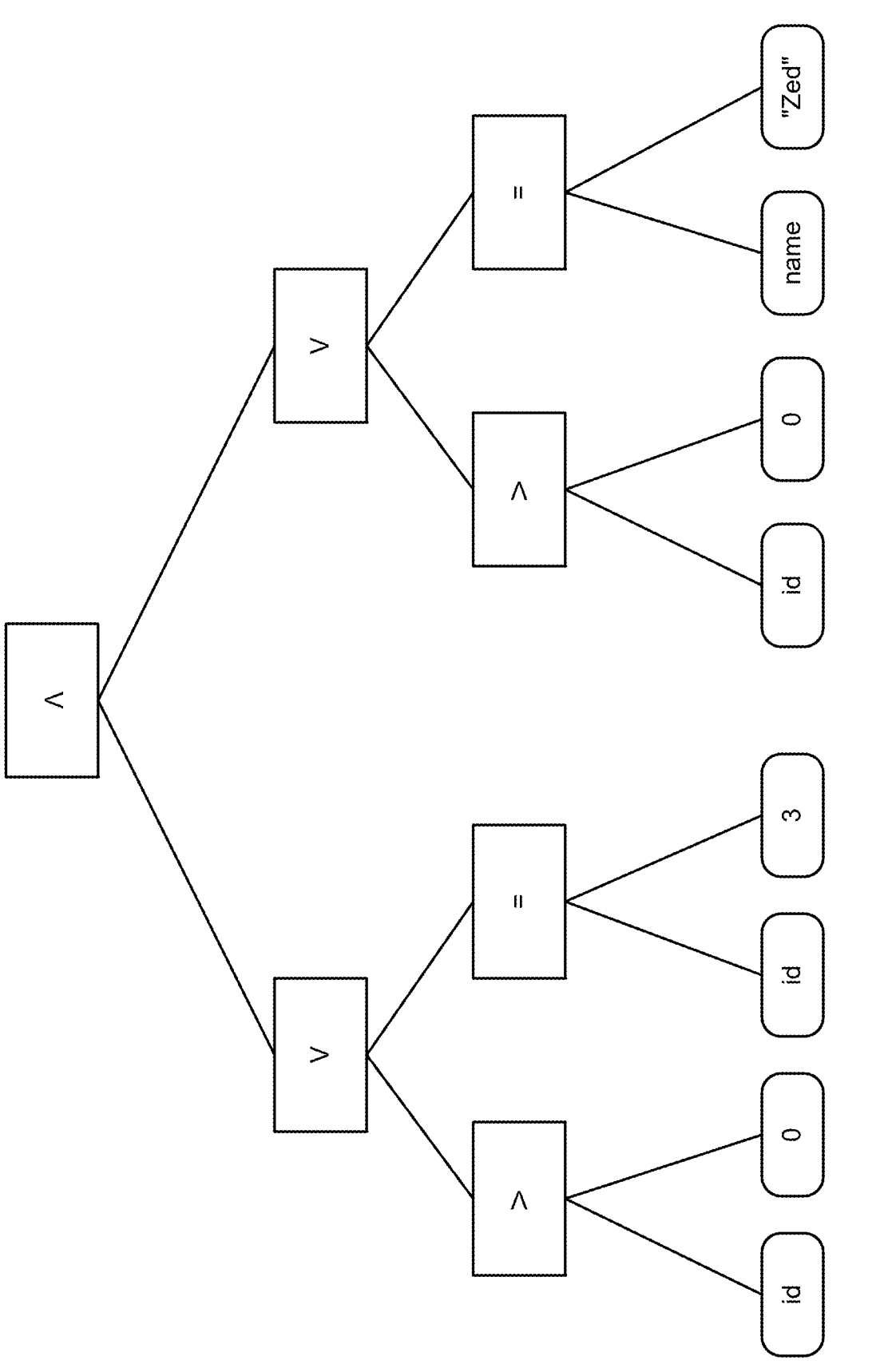
FIG. 13 illustrates a normalized version of the predicate expression data instance of FIG. 12.

The predicate expression normalizer normalizes the tree shown in FIG. 12 by applying the rules listed in the under the predicate expression normalizer section to generate the tree shown in FIG. 13.

Figure 14:
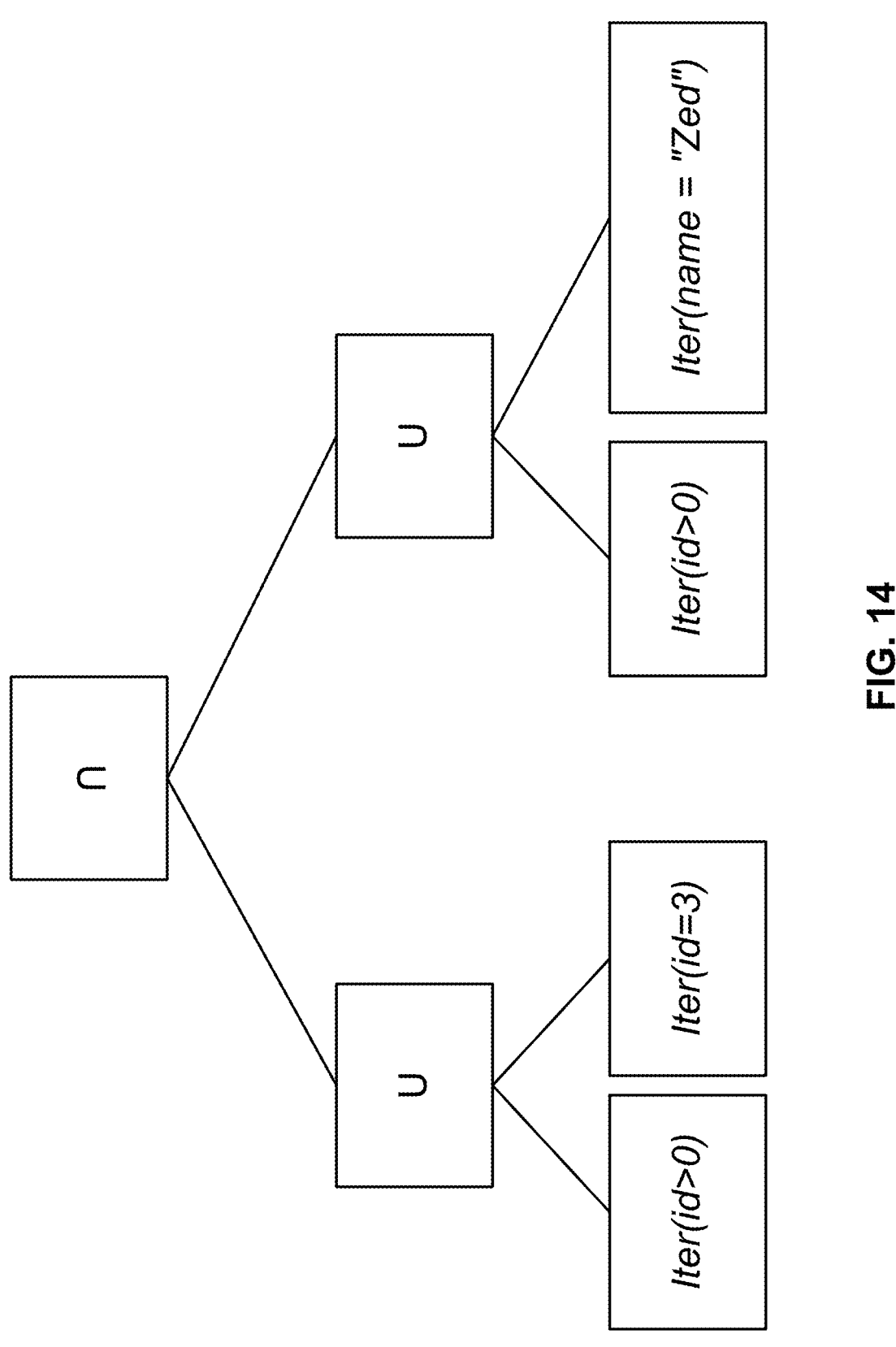
FIG. 14 illustrates a lazy object iterator tree, according to one embodiment.

From the normalized predicate expression data instance, the iterator tree generator may generate an iterator tree in the form of a lazy object iterator tree as shown in FIG. 14.

The query may be executed by the iterator tree evaluation engine as described below:
    evaluate[[(iter(id    >0)∪iter(id=3))∩(iter(id    >0)∪iter
        (name="Zed"))]](E$_D$,⊘)

The application of the semantic equations in the lazy data object iterator tree evaluation section by means of the evaluation engine may yield the following final result:
    ={(name: Zed, age: 1),⊘}.

Figure 15:
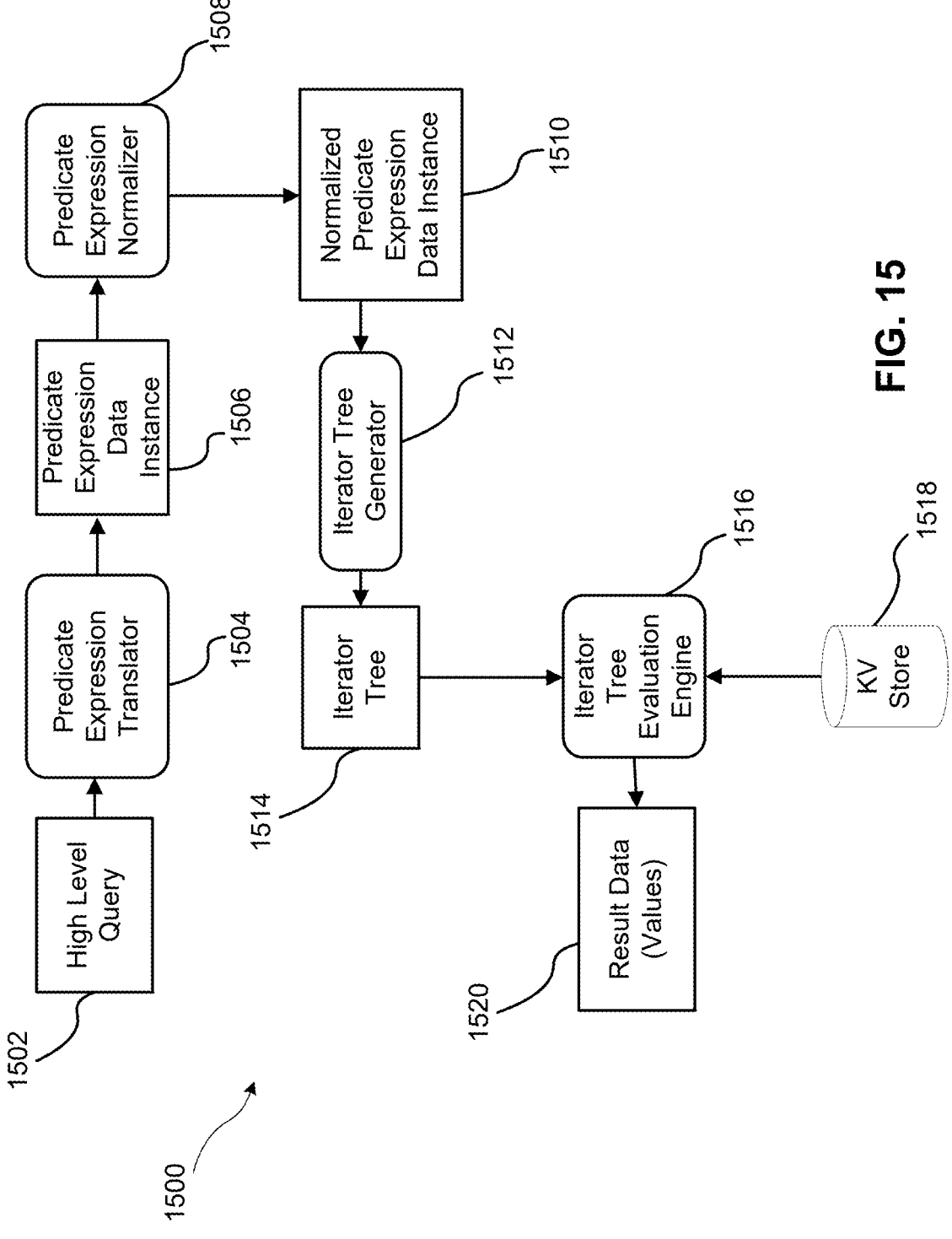
FIG. 15 illustrates a process for converting and executing a high-level query, according to one embodiment.

Referring now to FIG. 15, there is disclosed a process 1500 for converting and executing a high-level query 1502. In some embodiments, various steps in the process 1500 may be performed by conversion engine 220, the execution engine 230, or any other engines of the computing server 130 of FIG. 2. The process 1500 may include a high-level query 1502, a predicate expression translator 1504, a predicate expression data instance 1506, a predicate expression normalizer 1508, a normalized predicate expression data instance 1510, an iterator tree generator 1512, an iterator tree 1514, an iterator tree evaluation engine 1516, a KV store 1518, and result data 1520. In some embodiments, the predicate expression translator 1504, the predicate expression normalizer 1508, the iterator tree generator 1512, and the iterator tree evaluation engine 1516 may be implemented by the execution engine 230 or any other engines of the computing server 130 of FIG. 2.

The high-level query 1502 is submitted by a user. It may be in a high-level query language. The computing server 130 may input the high-level query 1502 into the predicate expression translator 1504. The predicate expression translator 1504 converts the high-level query 1502 into a standardized format called a predicate expression data instance 1506. The predicate expression translator 1504 may convert the high-level query into a predicate expression data instance by parsing and analyzing the query's structure and components. It may begin by breaking down the query into its constituent parts, identifying individual predicates, logical operators, and variables. The predicate expression translator 1504 may then construct a hierarchical representation, for example in the form of a tree-like structure. In this structure, nodes may represent variables (such as attributes or fields being queried) and predicates (conditions or comparisons applied to these variables). The relationships between these nodes may be represented by arcs, which capture the logical flow and dependencies within the query. This process may transform the high-level query 1502 into a standardized, machine-readable format that preserves the query's logical structure and semantics. The resulting predicate expression data instance 1506 may serve as an intermediate representation of the high-level query 1502.

The computing server 130 may input the predicate expression data instance 1506 into the predicate expression normalizer 1508. The predicate expression normalizer 1508 may optimize the predicate expression data instance 1506 through several steps. It may begin by removing redundant predicates, such as by deduplicating any repeated logical conditions. The predicate expression normalizer 1508 may eliminate negations, which may impact query efficiency as negations can affect query execution time if directly translated into iterators. Instead of using negations, the predicate expression normalizer 1508 may convert them into semantically equivalent positive expressions. This process may include applying a set of transformation rules based on De Morgan's laws, iteratively transforming the expression until no further optimizations can be made (reaching a fixed point). These rules may include pushing negations downward, eliminating double negations, simplifying logical expressions, and combining identical predicates connected by logical AND or OR operations. Optionally, the predicate expression normalizer 1508 may convert the predicate expression data instance 1506 into CNF, which can potentially reduce overall query evaluation time by allowing early termination of evaluation if any conjunctive clause is false. This optimization process may provide a normalized predicate expression data instance 1510 that is more efficient for subsequent query processing steps. The predicate expression normalizer 1508 outputs the normalized predicate expression data instance 1510, which is the optimized version of the predicate expression data instance 1506.

The computing server 130 may take the normalized predicate expression data instance 1510 and pass it to the iterator tree generator 1512, which creates an iterator tree 1514. The iterator tree 1514 may be a hierarchical structure that represents an optimized plan for executing the query. The iterator tree 1514 may be implemented as a lazy data object iterator tree, designed for efficient query processing in key-value stores. The iterator tree generator 1512 may convert each predicate in the normalized predicate expression data instance 1510 into corresponding iterator nodes and arranges these nodes in a structure that reflects the logical relationships of the original query (the high-level query 1502). The "lazy" aspect means that it sets up a plan for how and when to access data, rather than immediately retrieving all data. The iterator tree 1514 may prioritize more selective predicates, for example to reduce the overall amount of data that needs to be processed. The iterator tree 1514 may be structured to minimize unnecessary database reads by using a layered data access approach: first checking cached data, then using index entries, and only performing full data scans as a last resort. This optimization may be particularly beneficial in resource-constrained environments, as it efficiently manages both memory usage and processing power by only retrieving and processing data as needed during query execution.

The computing server 130 may receive the generated iterator tree 1514 and inputs it into the iterator tree evaluation engine 1516. The iterator tree evaluation engine 1516 may be responsible for executing the query against the KV store 1518. The iterator tree evaluation engine 1516 may implement a lazy evaluation strategy, meaning it may only retrieve and process data when necessary. This approach may be complemented by a layered data access method, which prioritizes efficient data retrieval. The iterator tree evaluation engine 1516 may first check for cached data, then use index entries if available, and only resort to full data scans when absolutely necessary. As the iterator tree evaluation engine 1516 traverses the iterator tree 1514, the iterator tree evaluation engine 1516 may evaluate each node, applying the predicates and operations defined in the tree structure. It may leverage the KV store's prefix search capabilities for efficient data lookup. This lazy evaluation may provide that only the minimum required data is fetched and processed at each step, while the layered approach may reduce costly database reads. This combination of strategies may provide the iterator tree evaluation engine 1516 to execute complex queries efficiently, even in resource-constrained environments, by optimizing both memory usage and processing power throughout the query execution process.

The KV store 1518 is the key-value database where the actual data is stored and organized. During query execution, the iterator tree evaluation engine 1516 may interact directly with this KV store 1518 to retrieve the requested data. The KV store 1518 may organize data as key-value pairs, where each piece of data (value) is associated with a unique identifier (key). When the iterator tree evaluation engine 1516 needs to access data, the KV store 1518 may use the optimized search patterns defined in the iterator tree 1514 to efficiently locate and retrieve relevant key-value pairs from the store. The iterator tree evaluation engine 1516 may perform operations like seeking specific keys, scanning ranges of keys, or accessing index entries, depending on the query requirements. The KV store's structure may provide for quick data access, which, combined with the engine's lazy evaluation strategy, may provide efficient query execution even for complex queries or large datasets. This direct interaction between the iterator tree evaluation engine 1516 and the KV store 1518 may maintain the performance benefits of the key-value data model while executing higher-level, more complex queries.

The iterator tree evaluation engine 1516 may retrieve matching data from the KV store 1518 and compile it into the result data 1520. As matching data is found, the iterator tree evaluation engine 1516 may accumulate the results. It may perform additional processing on the retrieved data, such as applying any filters or transformations specified in the query that could not be directly translated into KV store operations. The iterator tree evaluation engine 1516 may then compile all the matching or processed data into a structured format, creating the final result data 1520. This result data 1520 may represent the complete set of information that satisfies the original query (the high-level query 1502) criteria, organized in a way that can be easily returned or displayed to the user or passed on for further application-level processing. The computing server 130 may further format the result data 1520 for display in a GUI.

Computing System Architecture

Figure 16:
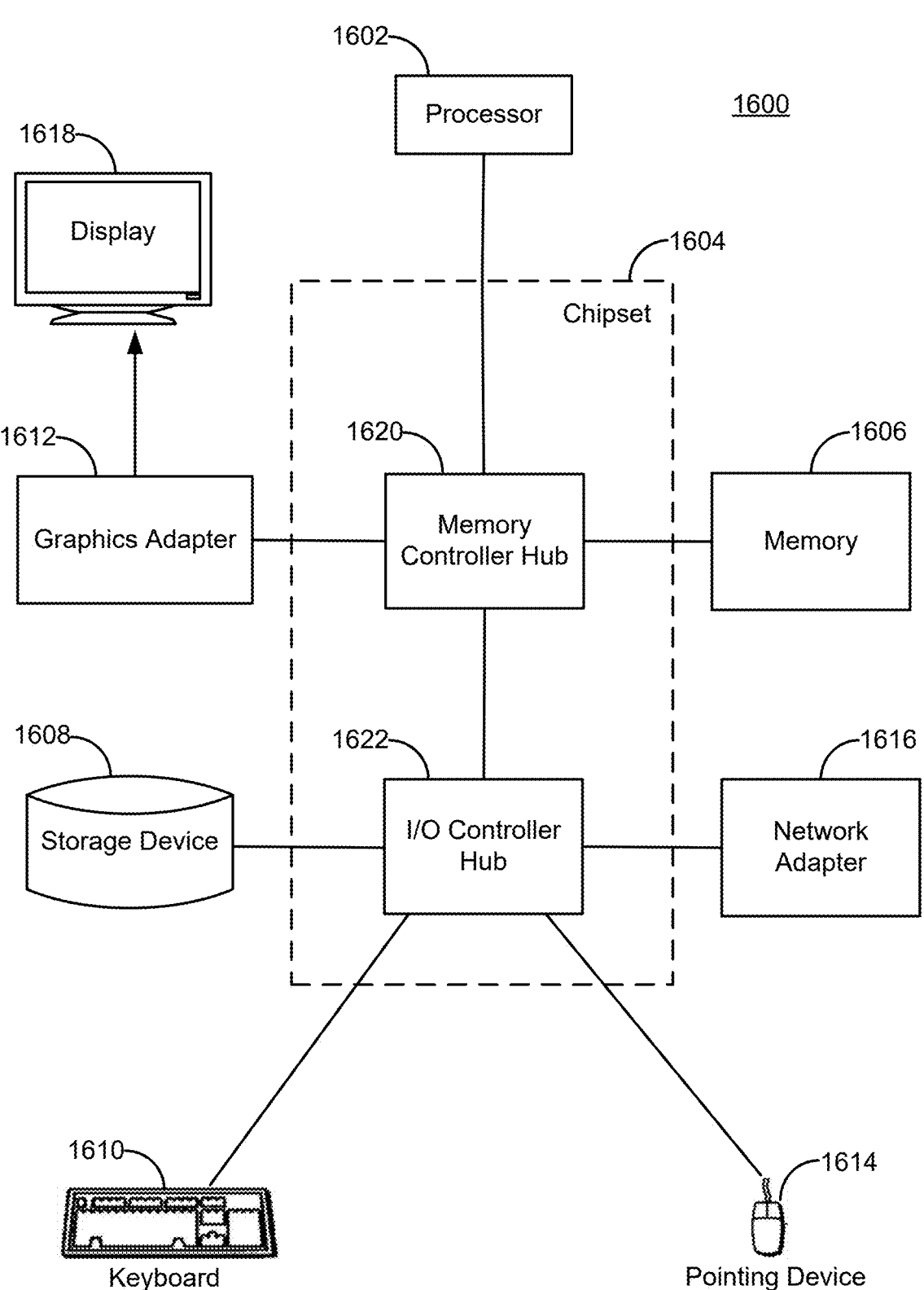
FIG. 16 is a block diagram illustrating an example computer suitable for use in the networked computing environment of FIG. 1, according to one embodiment.

FIG. 16 is a block diagram of an example computer 1600 suitable for use as a client device 120 or computing server 130. The example computer 1600 includes at least one processor 1602 coupled to a chipset 1604. The chipset 1604 includes a memory controller hub 1620 and an input/output (I/O) controller hub 1622. A memory 1606 and a graphics adapter 1612 are coupled to the memory controller hub 1620, and a display 1618 is coupled to the graphics adapter 1612. A storage device 1608, keyboard 1610, pointing device 1614, and network adapter 1616 are coupled to the I/O controller hub 1622. Other embodiments of the computer 1600 have different architectures.

In the embodiment shown in FIG. 16, the storage device 1608 is a non-transitory computer-readable storage medium such as a hard drive, compact disk read-only memory (CD-ROM), DVD, or a solid-state memory device. The memory 1606 holds instructions and data used by the processor 1602. The pointing device 1614 is a mouse, track ball, touch-screen, or other type of pointing device, and may be used in combination with the keyboard 1610 (which may be an on-screen keyboard) to input data into the computer system 1600. The graphics adapter 1612 displays images and other information on the display 1618. The network adapter 1616 couples the computer system 1600 to one or more computer networks, such as network 140.

The types of computers used by the entities of FIGS. 1 and 2 can vary depending upon the embodiment and the processing power required by the entity. For example, the computing server 130 might include multiple blade servers working together to provide the functionality described while the client device 120 might be a desktop workstation or tablet. Furthermore, computers 1600 can lack some of the components described above, such as keyboards 1610, graphics adapters 1612, and displays 1618.

ADDITIONAL CONSIDERATIONS

Some portions of the above description describe the embodiments in terms of algorithmic processes or operations. These algorithmic descriptions and representations are commonly used by those skilled in the computing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the elements or components are present unless it is obvious that it is meant otherwise.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs for a system and a process/method as described in the present disclosure. Thus, while particular embodiments and applications have been illustrated and described, it is to be understood that the described subject matter is not limited to the precise construction and components disclosed. The scope of protection should be limited only by the following claims.

What is claimed is:

1. A system, comprising:
a computing server comprising a processor and memory in communication with the processor, the memory configured to store code comprising instructions, wherein the instructions, when executed by the system, cause the system to perform steps comprising:
receiving a query from a user device;
converting the query into a predicate expression data instance;
generating an iteration tree based on the predicate expression data instance, comprising:
transforming each predicate in the predicate expression data instance into a corresponding iterator node; and
arranging the iterator nodes in a hierarchical structure that reflects logical relationships among the predicates to create the iteration tree;
determining search data based on the generated iteration tree, comprising:
traversing the hierarchical structure of the iterator nodes in the generated iteration tree to identify the search data having at least one attribute associated with at least one iterator node; and
generating a prefix based on the at least one attribute associated with the at least one iterator node;
accessing a set of index entries of a data store;
searching the set of index entries based on the search data, wherein searching the set of index entries based on the search data comprises:
comparing the prefix of a given key of the search data to the set of index entries;
responsive to the given key matching an entry of the set of index entries, accessing a data object corresponding to the given key in the data store and adding the given key and its corresponding data object to a result dataset;
iteratively searching the set of index entries in a predefined order until all keys of the search data are considered; and
compiling the result dataset; and
causing a graphical user interface to display an indicator associated with the result dataset.

2. The system of claim 1, wherein the predicate expression data instance comprises:
nodes representing variables and predicates from the query; and
arcs connecting the nodes to represent logical relationships between the variables and predicates.

3. The system of claim 1, wherein converting the query into the predicate expression data instance comprises:
parsing the query using a predefined structure;
identifying one or more predicates within the query; and
generating the predicate expression data instance as a data structure to represent the logical relationships between the identified predicates.

4. The system of claim 3, wherein converting the query into the predicate expression data instance further comprises:
processing the generated the predicate expression data instance to remove redundancies.

5. The system of claim 4, wherein processing the generated the predicate expression data instance to remove redundancies comprises:
iteratively applying a set of logical transformation rules to the predicate expression data instance until a fixed point is reached where no further optimizations can be made,
wherein the logical transformation rules comprises one or more of:
removing redundant predicates;
eliminating double negations;
simplifying logical expressions; or
combining identical predicates connected by logical AND or OR operations.

6. The system of claim 1, wherein generating the iteration tree based on the predicate expression data instance comprises:
converting each predicate in the predicate expression data instance into a corresponding iterator node; and
arranging the iterator nodes in a hierarchical structure that reflects logical relationships based on the predicate expression data instance.

7. The system of claim 1, wherein generating the iteration tree based on the predicate expression data instance comprises:
generating a lazy data object iterator tree based on the predicate expression data instance wherein the lazy data object iterator tree prioritizes execution of a first type of predicates and implements lazy evaluation of predicates to minimize unnecessary data retrieval.

8. The system of claim 1, wherein determining search data based on the generated iteration tree comprises:
traversing the iteration tree to identify predicate nodes;
for each identified predicate node:
evaluating the predicate to determine an operation on an indexed attribute in the data store; and
responsive to predicates operating on indexed attributes, formulating a key prefix by using a name of the indexed attribute as a prefix base, and appending, to the prefix base, a value or range based on a condition of the predicates; and
compiling a dataset of search data, the dataset of search data comprising the formulated key prefixes.

9. The system of claim 8, wherein determining search data based on the generated iteration tree further comprises:
estimating a selectivity of each formulated key prefix;
assigning priorities to the formulated key prefixes based on their estimated selectivity and/or characteristics of the data store; and compiling the dataset of search data, the dataset of search data comprising the formulated key prefixes ordered based on their assigned priorities.

10. The system of claim 8, wherein accessing the set of index entries of the data store comprises:

causing electronic communication to the data store where the index entries are located; and identifying the set of index entries based on attributes referenced in the determined search data.

11. The system of claim 1, wherein the data store includes a key-value store.

12. A method, comprising:

receiving a query from a user device;

converting the query into a predicate expression data instance;

generating an iteration tree based on the predicate expression data instance, comprising:

transforming each predicate in the predicate expression data instance into a corresponding iterator node; and arranging the iterator nodes in a hierarchical structure that reflects logical relationships among the predicates to create the iteration tree;

determining search data based on the generated iteration tree, comprising:

traversing the hierarchical structure of the iterator nodes in the generated iteration tree to identify the search data having at least one attribute associated with at least one iterator node; and generating a prefix based on the at least one attribute associated with the at least one iterator node;

accessing a set of index entries of a data store;

searching the set of index entries based on the search data, wherein searching the set of index entries based on the search data comprises:

comparing the prefix of a given key of the search data to the set of index entries;

responsive to the given key matching an entry of the set of index entries, accessing a data object corresponding to the given key in the data store and adding the given key and its corresponding data object to a result dataset;

iteratively searching the set of index entries in a predefined order until all keys of the search data are considered; and compiling the result dataset; and causing a graphical user interface to display an indicator associated with the result dataset.

13. The method of claim 12, wherein the predicate expression data instance comprises:

nodes representing variables and predicates from the query; and arcs connecting the nodes to represent logical relationships between the variables and predicates.

14. The method of claim 12, wherein converting the query into the predicate expression data instance comprises:

parsing the query using a predefined structure;

identifying one or more predicates within the query; and generating the predicate expression data instance as a data structure to represent the logical relationships between the identified predicates.

15. The method of claim 14, further comprising:

processing the generated predicate expression data instance to remove redundancies.

16. The method of claim 15, wherein processing the generated the predicate expression data instance to remove redundancies comprises:

iteratively applying a set of logical transformation rules to the predicate expression data instance until a fixed point is reached where no further optimizations can be made, wherein the logical transformation rules comprises:

removing redundant predicates;

eliminating double negations;

simplifying logical expressions; and/or combining identical predicates connected by logical AND or OR operations.

17. The method of claim 12, wherein generating the iteration tree based on the predicate expression data instance comprises:

converting each predicate in the predicate expression data instance into a corresponding iterator node; and arranging the iterator nodes in a hierarchical structure that reflects logical relationships based on the predicate expression data instance.

18. The method of claim 12, wherein generating the iteration tree based on the predicate expression data instance comprises:

generating a lazy data object iterator tree based on the predicate expression data instance wherein the lazy data object iterator tree prioritizes execution of a first type of predicates and implements lazy evaluation of predicates to minimize unnecessary data retrieval.

19. The method of claim 12, wherein determining search data based on the generated iteration tree comprises:

traversing the iteration tree to identify predicate nodes;

for each identified predicate node:

evaluating the predicate to determine an operation on an indexed attribute in the data store; and responsive to predicates operating on indexed attributes, formulating a key prefix by using a name of the indexed attribute as a prefix base, and appending, to the prefix base, a value or range based on a condition of the predicates; and compiling a dataset of search data, the dataset of search data comprising the formulated key prefixes.

20. A computer program product comprising a non-transitory computer readable storage medium having instructions encoded thereon that, when executed by a computing system, cause the computing system to perform operations including:

receiving a query from a user device;

converting the query into a predicate expression data instance;

generating an iteration tree based on the predicate expression data instance, comprising:

transforming each predicate in the predicate expression data instance into a corresponding iterator node; and arranging the iterator nodes in a hierarchical structure that reflects logical relationships among the predicates to create the iteration tree;

determining search data based on the generated iteration tree, comprising:

traversing the hierarchical structure of the iterator nodes in the generated iteration tree to identify the search data having at least one attribute associated with at least one iterator node; and generating a prefix based on the at least one attribute associated with the at least one iterator node;

accessing a set of index entries of a data store;

searching the set of index entries based on the search data, wherein searching the set of index entries based on the search data comprises:

comparing the prefix of a given key of the search data to the set of index entries;

responsive to the given key matching an entry of the set of index entries, accessing a data object corresponding to the given key in the data store and adding the given key and its corresponding data object to a result dataset;

iteratively searching the set of index entries in a predefined order until all keys of the search data are considered; and compiling the result dataset; and causing a graphical user interface to display an indicator associated with the result dataset.

\* \* \* \* \*